(12) United States Patent
Green et al.

(10) Patent No.: US 10,832,130 B2
(45) Date of Patent: Nov. 10, 2020

(54) RECOMMENDING A DOCUMENT FOR A USER TO ACCESS

(71) Applicant: GOOGLE INC., Mountain View, CA (US)

(72) Inventors: Alan Green, Penrith (AU); Cayden Meyer, Pyrmont (AU); Julian Gibbons, Cremore (AU); Alexandre Mah, Epping (AU); Divanshu Garg, Pyrmont (AU); Reuben Kan, Carling Ford (AU); Michael Smith, West Ryde (AU); Sandeep Tata, San Francisco, CA (US); Alexandrin Popescul, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 345 days.

(21) Appl. No.: 15/479,634

(22) Filed: Apr. 5, 2017

(65) Prior Publication Data
US 2018/0081503 A1 Mar. 22, 2018

Related U.S. Application Data

(60) Provisional application No. 62/396,445, filed on Sep. 19, 2016.

(51) Int. Cl.
*G06F 3/048* (2013.01)
*G06N 3/08* (2006.01)
(Continued)

(52) U.S. Cl.
CPC .......... *G06N 3/08* (2013.01); *G06F 16/9535* (2019.01); *G06N 3/0454* (2013.01); *G06N 3/084* (2013.01)

(58) Field of Classification Search
CPC ........ G06N 3/08; G06N 3/0454; G06N 3/084; G06N 3/02
(Continued)

(56) References Cited

U.S. PATENT DOCUMENTS

| 7,698,071 B2* | 4/2010 | Harris | G06K 9/6228 |
| | | | 702/19 |
| 2008/0025596 A1* | 1/2008 | Podilchuk | G06K 9/6215 |
| | | | 382/155 |

(Continued)

OTHER PUBLICATIONS

Tian, W., et al., "An Adaptive Web Cache Access Predictor Using Neural Network", 2002, Developments in Applied Artificial Intelligence, IEA/AIE 2002, Lecture Notes in Artificial Intelligence, vol. 2358, pp. 450-459, 2002. (Year: 2002).*

(Continued)

*Primary Examiner* — Brandon S Cole
(74) *Attorney, Agent, or Firm* — Brake Hughes Bellermann, LLP

(57) ABSTRACT

A user device can send, to a server, a request for a set of documents likely to be opened by a user, determine a client-suggested document to present to the user and a potential motive for the user to open the client-suggested document, receive a suggestion message from the server, the suggestion message including a set of documents likely to be opened by the user and potential motives for the user to open documents in the set of documents, and present, on a display of the user device, visual representations of the client-suggested document, the potential motive for the user to open the client-suggested document, multiple documents included in the set of documents, and the potential motives for the user to open the multiple documents in the set of documents.

20 Claims, 16 Drawing Sheets

(51) Int. Cl.
*G06K 9/62* (2006.01)
*G06N 3/04* (2006.01)
*G06F 16/9535* (2019.01)

(58) Field of Classification Search
USPC ..................................................... 706/1–62
See application file for complete search history.

(56) References Cited

U.S. PATENT DOCUMENTS

2018/0081503 A1* 3/2018 Green .................. G06N 3/0454
2018/0204120 A1* 7/2018 Rei ........................ G06N 3/084

OTHER PUBLICATIONS

Burges, C., J., C., et al., "Learning to Rank using Gradient Descent", 2005, Proceedings of the 22 nd International Conference on Machine Learning, Bonn, Germany, 2005 (Year: 2005).*

Berlemont, S., et al., "Siamese Neural Network based Similarity Metric for Inertial Gesture Classification and Rejection", 2015, 2015 11th IEEE International Conference and Workshops on Automatic Face and Gesture Recognition (FG), May 4-8, 2015 (Year: 2015).*

Cosley, D., et al., "SuggestBot: Using Intelligent Task Routing to Help People Find Work in Wikipedia", 2007, Proceedings of IUI, Jan. 28-31, 2007, Honolulu, Hawaii, USA., p. 32-41 (Year: 2007).*

"Artificial Neural Network", Wikipedia (https://en.wikipedia.org/wiki/Artificial_neural_network), printed Sep. 16, 2016, 20 pages.

"Rectifier (Neural Networks)", Wikipedia (https://en.wikipedia.org/wiki/Rectifier_(neural_networks)), printed Sep. 16, 2016, 3 pages.

"Show or Hide the "My recent documents" from XP Start menu", Ramesh's site Troubleshooting Windows (http"f/windowsxp.mvps.crgtrecentdocs.hlm), printed Sep. 16, 2016, 3 pages.

Vincent, "Google's Springboard is a search engine built for enterprise customers", The Verge (http://www.theverge.com/2016/6/14/11931832/google-springboard-enterprise-assistant-search),, Jun. 14, 2016, 10 pages.

* cited by examiner

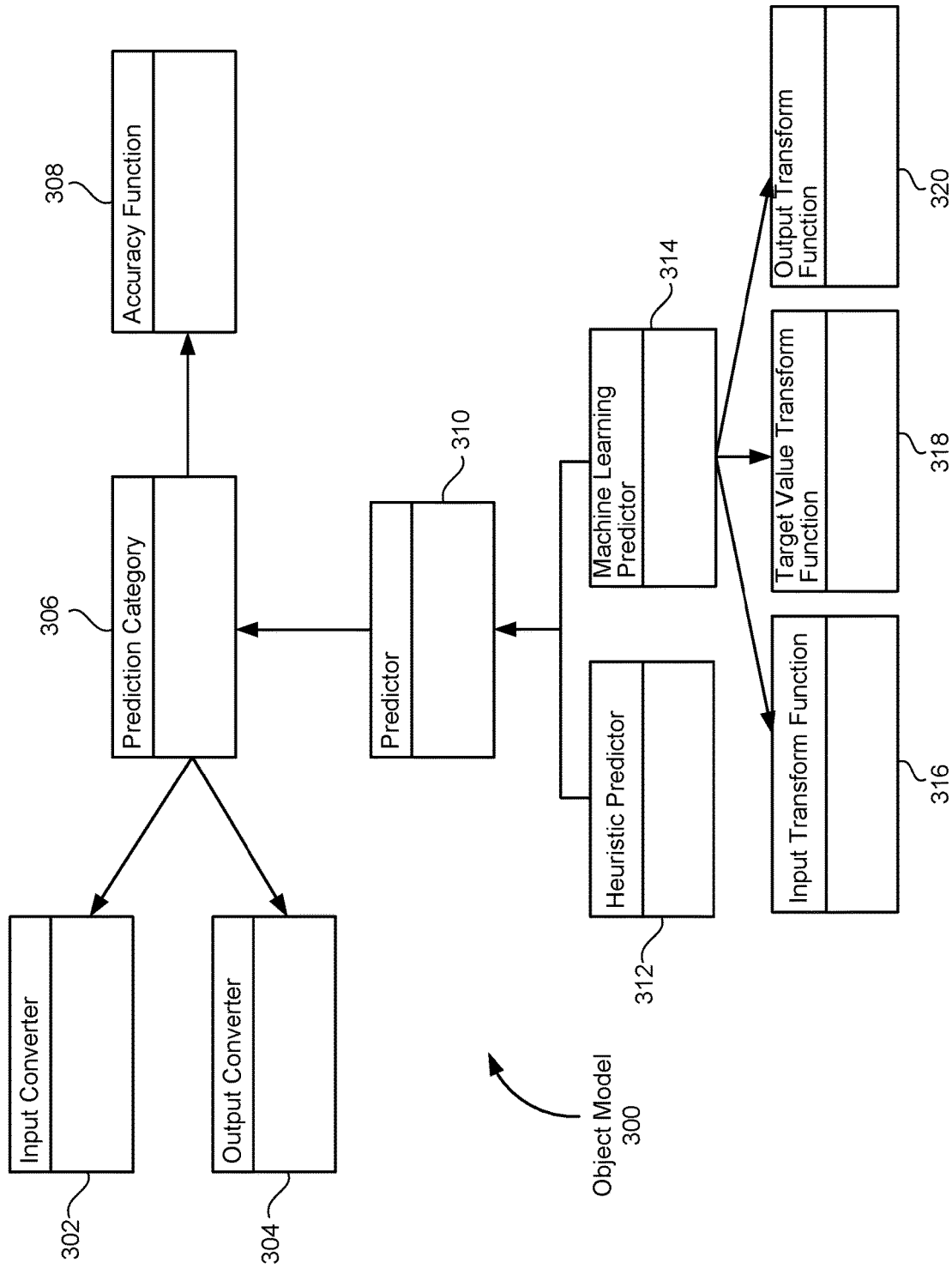

RECOMMENDING A DOCUMENT FOR A USER TO ACCESS

PRIORITY CLAIM

This Application claims priority to U.S. Provisional Application No. 62/396,445, filed on Sep. 19, 2016, entitled, "DETERMINING DOCUMENT THAT A USER WILL OPEN," the disclosure of which is hereby incorporated by reference.

TECHNICAL FIELD

This description relates to accessing files on a computing system.

BACKGROUND

In some computing systems, such as smartphones, the display may be small, making it difficult to view icons representing a large number of documents. A user may have difficulty accessing a desired document.

SUMMARY

A user device can request, from a server, a set of documents likely to be opened by a user of the user device. To reduce apparent latency, the user device can determine a client-suggested document while waiting for the set of documents from the user. The user device can recommend documents by presenting visual representations of the client-suggested document and the set of documents received from the server. The user device can also present potential motives for the user to open the documents. The presentation of the visual representations of documents likely to be opened by the user can facilitate quick access to the user and relieve the user from having to navigate file paths to find the desired document.

The documents that the user is likely to access, and/or should be recommended to the user, can be determined by a server in association with a neural network. The neural network can be trained by determining scores for pairs of vectors representing pairs of documents, one of which was selected by the user and one of which was not selected by the user in a specific context. The neural network can determine scores for multiple documents in response to a request from the user device for the set of documents likely to be opened and/or accessed by the user. Documents can be selected based on the scores. The server can send the documents, and potential motives for the user to open the documents, to a client device in response to a request for a set of documents likely to be opened by the user.

According to an example, a user device can include at least one processor and a non-transitory computer-readable storage medium comprising instructions stored thereon. When executed by the at least one processor, the instructions are configured to cause the user device to send, to a server, a request for a set of documents likely to be opened by a user, determine a client-suggested document to present to the user and a potential motive for the user to open the client-suggested document, receive a suggestion message from the server, the suggestion message including a set of documents likely to be opened by the user and potential motives for the user to open documents in the set of documents, and present, on a display of the user device, visual representations of the client-suggested document, the potential motive for the user to open the client-suggested document, multiple documents included in the set of documents, and the potential motives for the user to open the multiple documents in the set of documents.

According to another example, a method of training a neural network to determine scores for documents, the scores indicating likelihoods of a user selecting the respective documents, can include determining, by the neural network, a first score for a first vector representing a first document that was selected by the user in a specific context, the first vector including indications of interactions by the user with the first document, determining, by the neural network, a second score for a second vector representing a second document that was not selected by the user in the specific context, the second vector including indications of interactions by the user with the second document, determining an error value based on a function that includes both the first score and the second score, and modifying the neural network based on the error value.

According to another example, a method performed by a server can include receiving, from a user device, a request for a set of documents likely to be accessed in association with a user account, determining scores for each of multiple documents stored in association with the user account, the scores indicating likelihoods that the documents will be accessed in association with the user account at a time of receiving the request, selecting at least one document from the multiple documents based on the determined scores, selecting, from multiple potential motives, at least one potential motive for the user account to access the at least one document, and sending, to the client device, a suggestion message including the at least one document and the at least one potential motive, the suggestion message prompting the user device to present at least one icon representing the at least one selected document in association with the at least one potential motive.

According to another example, a user device can include means for sending, to a server, a request for a set of documents likely to be opened by a user, means for determining a client-suggested document to present to the user and a potential motive for the user to open the client-suggested document, means for receiving a suggestion message from the server, the suggestion message including a set of documents likely to be opened by the user and potential motives for the user to open documents in the set of documents, and means for presenting, on a display of the user device, visual representations of the client-suggested document, the potential motive for the user to open the client-suggested document, multiple documents included in the set of documents, and the potential motives for the user to open the multiple documents in the set of documents.

According to another example, a neural network for determining scores for documents, the scores indicating likelihoods of a user selecting the respective documents, can include means for determining a first score for a first vector representing a first document that was selected by the user in a specific context, the first vector including indications of interactions by the user with the first document, means for determining a second score for a second vector representing a second document that was not selected by the user in the specific context, the second vector including indications of interactions by the user with the second document, means for determining an error value based on a function that includes both the first score and the second score, and means for modifying the neural network based on the error value.

According to another example, a server can include means for receiving, from a user device, a request for a set of documents likely to be accessed in association with a user account, means for determining scores for each of multiple documents stored in association with the user account, the scores indicating likelihoods that the documents will be accessed in association with the user account at a time of receiving the request, means for selecting at least one document from the multiple documents based on the determined scores, means for selecting, from multiple potential motives, at least one potential motive for the user account to access the at least one document, and means for sending, to the client device, a suggestion message including the at least one document and the at least one potential motive, the suggestion message prompting the user device to present at least one icon representing the at least one selected document in association with the at least one potential motive.

The details of one or more implementations are set forth in the accompanying drawings and the description below. Other features will be apparent from the description and drawings, and from the claims.

BRIEF DESCRIPTION OF THE DRAWINGS

FIG. 3 is a diagram of an object model of a system for predicting a next document that a user will access according to an example implementation.

DETAILED DESCRIPTION

To reduce an appearance of latency while requesting a set of documents that are likely to be opened by a user, a user device, can determine a single, client-suggested document and present the client-suggested document while waiting to receive, from a server, the set of documents that are likely to be opened by the user. To determine which documents to recommend to the user based on a prediction that the user is likely to open and/or access the documents, a server can train a neural network by determining scores for pairs of vectors representing pairs of documents, one of the documents having been opened by a user and the other document not having been opened by the user, determining error values for the scores, and modifying the neural network based on the error values. To assist the user in selecting a document from the set of documents, and/or increasing the user's confidence in the determined set of documents, the documents may be presented along with potential motives for the user to open the documents.

A system and/or computing system, which can be included in one or more servers or other computing devices, can determine documents that a user is likely to open and/or access ("open" and "access" may be used interchangeably herein). The computing system can generate and/or recommend a set of documents that the user is likely to open. The computing system can generate the set based on, for example, the user's interactions with the documents, attributes of the user at the time of generating the set, attributes of the documents in the set at the time of generating the list, and/or attributes of other documents stored in association with the user.

The computing system can generate the set by determining scores for each of multiple documents stored in association with the user. The scores can indicate likelihoods that the user will open the documents. The computing system can determine the scores for the documents by applying a neural network to the documents.

The computing system can send the set of documents to a client or user device, such as a smartphone. The set of documents can be included in a suggestion message. The computing system can also determine potential motives for the user to access each of the documents. The potential motives can be determined based on user activity with the documents.

Figure 1:
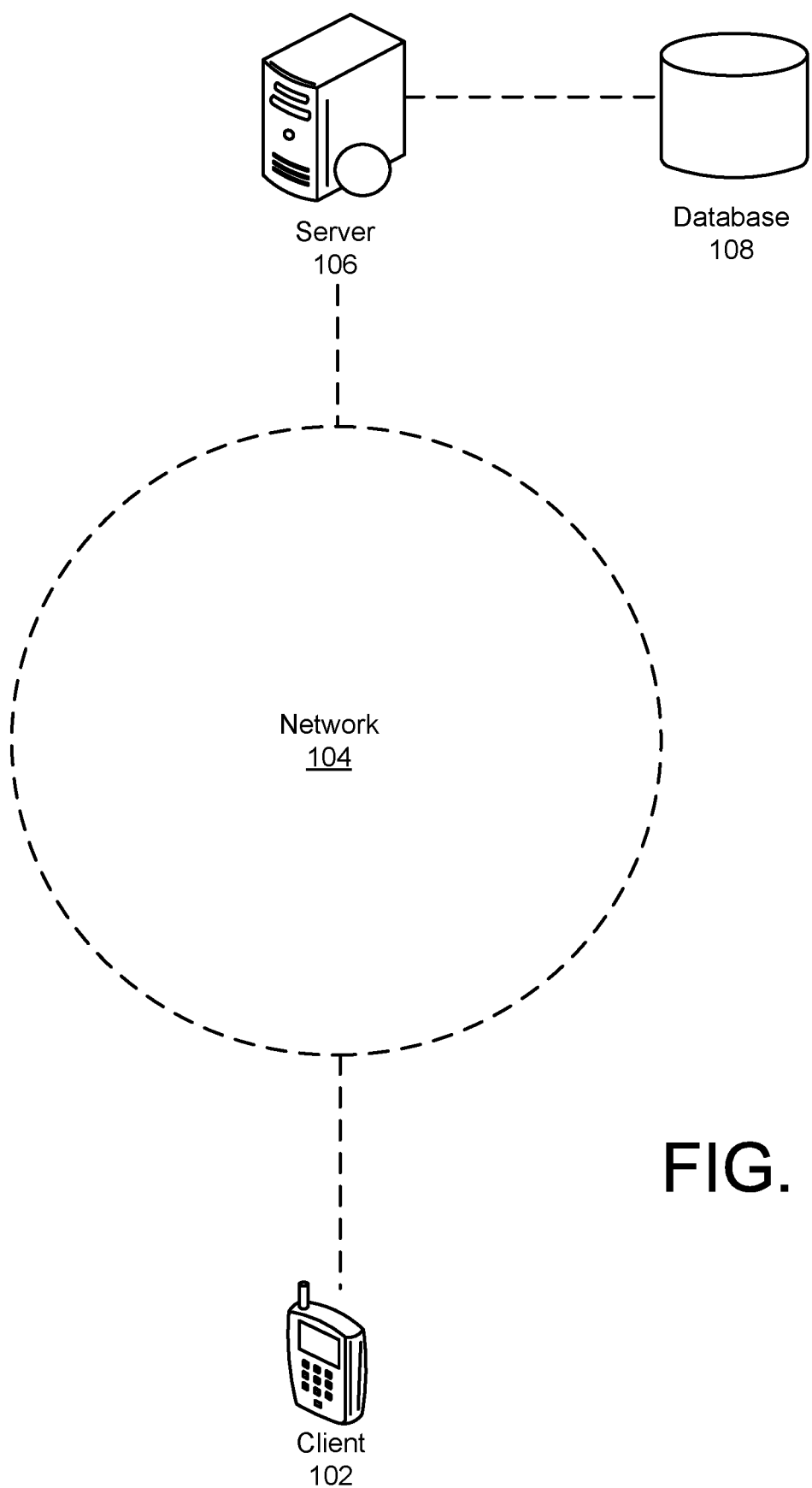
FIG. 1 is a diagram of a system for determining and presenting documents to a user according to an example implementation.

FIG. 1 is a diagram of a system for determining documents for presentation and presenting the documents to a user according to an example implementation. The system can include a client 102, a server 106, a network 104 via which the client 102 and the server 106 communicate, and a database 108 accessible by the server 106. While a single server 106 is shown in FIG. 1, the server 106 can represent multiple servers in a distributed computing system. The network 104 can include any network via which computing devices including the client 102 and server 106 communicate, such as a local area network (LAN), wide area network (WAN), or the Internet. The client 102 can be considered a user device and can include a mobile device that communicates with the network 104 via a wired or wireless communication protocol, including via a cellular communication network, such as the Analog Mobile Phone System (AMPS), Global System for Mobile Communication (GSM), General Packet Radio Service (GPRS), Universal Mobile Telecommunications System (UMTS), Long-Term Evolution (LTE), or Long-Term Evolution Advanced (LTE-Advanced), as non-limiting examples.

The client 102 can include a user device. The user device can be a mobile device such as a smartphone or tablet computer, or can include a laptop or desktop computer. The client 102 can have limited area on a display relative to the number of documents accessible by the client 102. To optimize use of the limited display area when accessing documents, the client 102 can present visual representations (e.g., icons, thumbnails, links, etc.) of a set of recommended and/or suggested documents that the user is likely to open. "Icons" is used as an example of a visual representation throughout this document. The set can include a limited number of documents. The client 102 and/or server 106 can determine which documents (and/or a single document) to include in the set of documents. The client 102 can identify one of the documents in the set as a client-suggested document, based on, for example, a single most recently accessed document by the client 102, a single document that has been most recently accessed by the server 106, or a single document that has been most frequently accessed by the client 102 over a predetermined time period, as non-limiting examples. The client 102 can display and/or present the client-suggested document determined by the client 102 to the user while the server 106 is determining additional documents to recommend and/or suggest for the client 102 to display to the user based on likelihoods that the user will open the additional documents.

The client 102 can send, to the server 106 via the network 104, a request for a set of documents likely to be opened by the user. The client 102 can send the request to the server 106 in response to launching an application such as a document access application, on the client 102. The document access application can present documents to the user that are associated with the user's account, and which are stored remotely on behalf of the user, such as in the database 108 accessible by the server 106.

The client 102 can receive, from the server 106, a suggestion message. The suggestion message can include identifiers for a set of documents, and/or the documents themselves, likely to be opened by the user. The suggestion message can also include, in association with each of the documents, potential explanations and/or motives as to why the documents should be opened and/or accessed by the user. The client 102 can present, on the display of the client 102, icons representing the suggested document(s) determined by the client 102, as well as icons representing the suggested documents determined and/or suggested by the server 106. The icons can also include data indicating the potential motives for the user to open the suggested documents.

The server 106 can receive the request for the set of documents likely to be opened by the user. The server 106 can, in response to receiving the request for the set of documents likely to be opened by the user, determine documents that a user is likely to open and/or access ("open" and "access" may be used interchangeably herein). The server 106 can, after determining the documents and/or while determining the documents that the user is likely to open, generate the set of documents likely to be opened by the user. The set can include an ordered set, in which the documents are ordered based on determined likelihood of being opened by a user (which can be based on a score for each of the documents), or an unordered set, in which the documents in the set have no particular order. The set can include the documents themselves, or identifiers of the documents for later retrieval by the client 102. The documents to be included in the set can be selected based on interactions with the documents by the user, attributes of the user at the time of generating the set, attributes of the documents in the set at the time of generating the set, and/or attributes of other documents stored in association with the user. The server 106 can access a database 108 which includes the documents, and can include metadata about the documents used to select documents to suggest and/or motives for suggesting the documents, such as when, how, and/or how frequently the user and/or other users accessed and/or interacted with the documents, and/or how the documents are related to the user, other users, other documents, and/or events on the user's calendar.

The server 106 can generate the list by determining scores for each of multiple documents stored in association with the user. The documents can be stored remotely, and accessible by the server 106. The scores can indicate likelihoods that the user will open the documents. The server 106 can sort the documents based on their scores, and generate the list based on the N documents with highest (or lowest) scores, where N can be a number such as three, five, ten, twenty, or any other number.

In an example implementation, the server 106 can consider events (which can represent interactions by the user or other users with the document or other documents associated with and/or accessible by the user) occurring within a predetermined time period, such as a predetermined time period including one week, two weeks, one month, or one year. The server 106 can determine the documents based on machine learning techniques, such as by applying vectors representing features of the documents to a neural network. The server 106 can, for example, determine and/or select a predetermined number of documents with highest likelihoods that the user will open the documents. In an example implementation, the likelihoods should meet a minimum threshold (such as at least eighty percent (80%)) of likeliness to be opened in order for the server 106 to include the document in the set of documents that is sent to the client 102. The minimum threshold can be applied to each of the documents, or to an average likelihood applied over all the documents to be sent to the client 102. The server 106 can send the set of documents to the client 102 for the client 102 to present on the display to the user.

The server 106 can determine the scores for the documents by applying a neural network to the documents. The neural network can be trained by inputting pairs of vectors representing different documents to different versions of the neural network, one of which was accessed by a user and the other of which was not accessed by the user, and determining scores for each of the documents in the pair. The two documents in each pair may share a same specific context. The vectors can include floating point numbers representing attributes of the document and the specific context (such as attributes of the user, the user's calendar, and/or interactions between the user and the document), the user for whom the likelihood of opening the document is being determined, and/or other items associated with the user's account. The scores, which can be numbers between zero (0) and one (1), can indicate likelihoods that the user will access the particular document. The neural network can be optimized to predict the likelihood of the user accessing the document.

The server 106 can send the list of documents to the client 102, which can include a client device or user device such as a smartphone. The set of documents can be included in a suggestion message. The server 106 can also determine potential motives for the user to access each of the documents. The motives can be based on the user having accessed the document within a predetermined time period, such as within the previous twenty-four hours or day, previous week, or previous month, the user having accessed the document frequently, such as at least a threshold number of times within a predetermined time period, the user having edited, commented on, or uploaded, the document within a predetermined time period, another user having shared or suggested the document to the user, the document being related to an upcoming meeting on the user's calendar, another user having commented on, edited, or uploaded the document, or the document being related to other documents associated with the user account, as non-limiting examples.

The client 102 can display the documents and/or icons representing the documents to the user, and can also display to the user the potential motives that the user can have for opening the documents. The client 102 can log and/or record whether the user opens the document and/or which document(s) the user opens, and send the results to the server 106. The server 106 can update its database 108 and/or neural network based on the results. The updating of the database 108 can increase the likelihood of presenting documents that the user will open in response to future requests for sets of documents likely to be opened by the user and/or other users.

In an example implementation, a user can control how the client 102 will assist him or her by presenting suggested documents to the user. The suggested and/or recommended documents are documents included in the set of documents that the user is likely to open, and/or the client-suggested document. The user can, for example, change settings to determine which rules should be applied and/or which documents should be presented. The user can also be prompted, via a user interface such as a graphical user interface (GUI), to provide explicit feedback, such as, "helpful," or, "not helpful." The client 102 can log and send the feedback to the server 106, so that the server 106 can calibrate future suggestions and/or suggested documents to maximize the benefit to the user, such as by providing more, "helpful," suggestions. The client 102 can also log the amount of time spent in, and/or the extent of interactions with (such as modifying and/or adding to) the accessed documents, and provide the results to the server 106, so that the server 106 will suggest documents that the user spends more time in and/or interacts with more extensively.

Figure 2A:
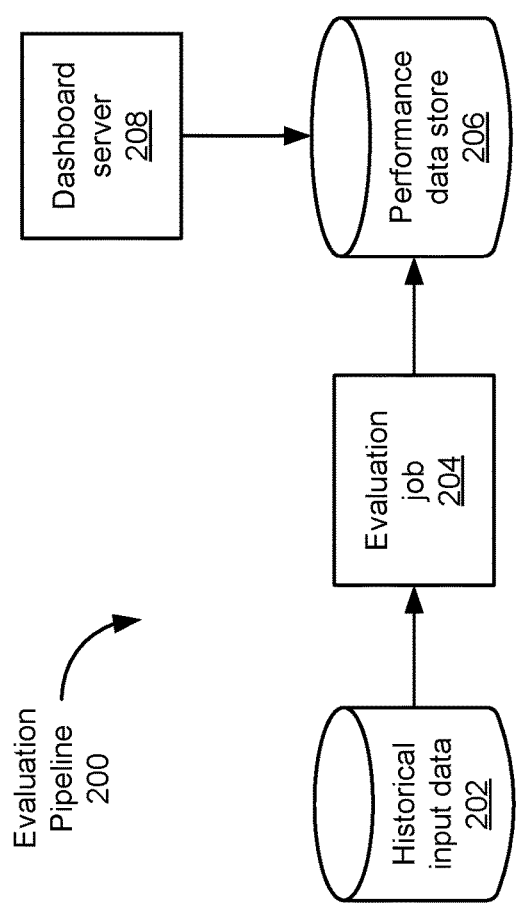
FIG. 2A is a diagram of an evaluation pipeline according to an example implementation.

FIG. 2A is a diagram of an evaluation pipeline 200 according to an example implementation. In the evaluation pipeline 200, tasks are performed concurrently, with the evaluation job 204 performing tasks while the dashboard server 208 performs tasks. In one implementation, at least a portion of evaluation pipeline 200 is included in the server 106. In this example, the evaluation pipeline 200 includes historical input data 202. The historical input data 202 can include previous predictions of which document a user will open (such as by suggesting a document and then determining whether the prediction was correct based on whether the user did or did not open the suggested document), either in training while the server is performing predictions on training data or in actual use when live users are receiving and acting on suggestions, and whether the user actually accessed the predicted and/or suggested documents. The evaluation pipeline 200 can include an evaluation job 204, which is a task within the evaluation pipeline 200, that includes a predictor that predicts which document the user will access in a specific context. The evaluation job 204 can perform predictions of which document a user will access in a specific context. The evaluation job 204 can evaluate the performance of the predictions from the historical input data 202 by determining whether predicted documents were actually accessed or opened by the user, and write the results of the evaluation to a performance data store 206. The performance data store 206 is written to by the evaluation job 204 within the evaluation pipeline 200. The evaluation pipeline 200 can include a dashboard server 208 that can query the performance data store 206 while the evaluation job 204 is writing to the performance data store 206 to determine, and provide, indications of accuracies of predictions.

Figure 2B:
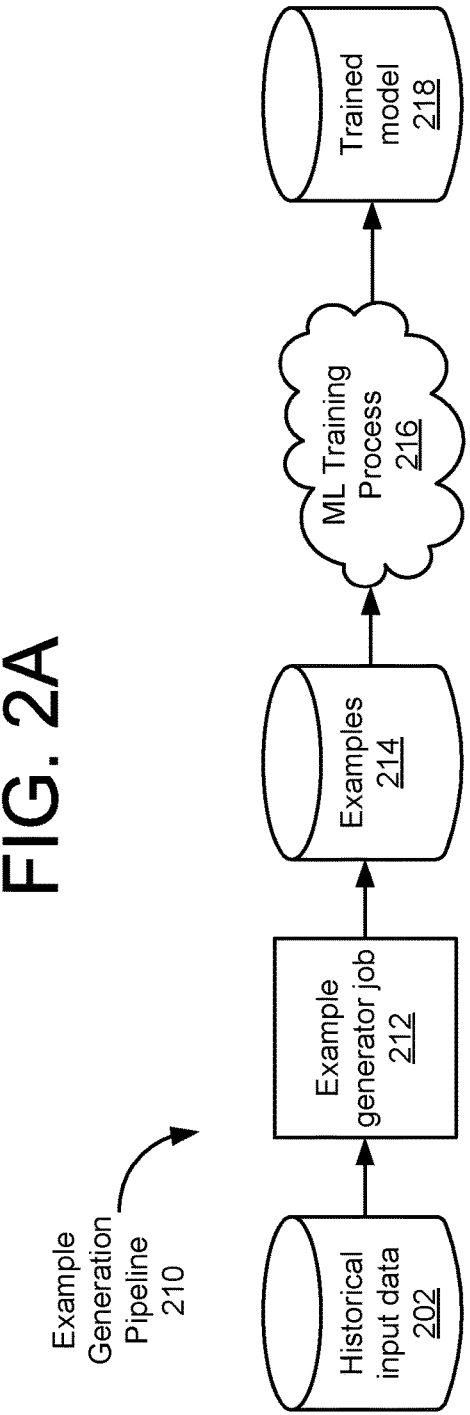
FIG. 2B is a diagram of an example generation pipeline according to an example implementation.

FIG. 2B is a diagram of a training example generation pipeline 210 according to an example implementation. In the training example generation pipeline 210, tasks are performed concurrently, with an example generator job 212 performing tasks while a machine learning training process 216 performs tasks, and the machine learning training process 216 uses examples 214 generated by the example generator job 212. The training example generation pipeline 210, which can be included in the server 106, can produce training examples of documents that are accessed and training examples of documents that are not accessed, which can be used by machine learning features of the server 106 to predict documents that the user is likely to access. The training example generation pipeline 210 can include the historical input data 202. The training example generation pipeline 210 can also include an example generator job 212 which receives data from the historical input data 202 to generate training examples 214. The examples 214 generated by the example generator job 212 can be based on less than all of the historical input data, such as eighty percent of the historical input data 202. The examples 214 included in the training example generation pipeline 210 can be inputted into a machine learning training process 216. The machine learning training process 216 can use the examples 214 to optimize predictions of a next document that the user will access, and can test the predictions on historical input data not used by the example generator job 212 to create the examples 214, such as the remaining twenty percent. The machine learning training process 216 can include training a neural network as described herein. The machine learning training process 216 can result in a trained model 218. The trained model can determine and/or select documents to present to the user, as well as motives for each of the determined and/or selected documents.

FIG. 3 is a diagram of an object model 300 of a system for predicting a next document that a user is likely to access according to an example implementation. The object model 300 can be included in the server 106.

The object model 300 can include a prediction category 306. The prediction category 306 can describe the kind of problem being solved by a predictor 310. The problem can be, for example, to return a predetermined number (e.g. three) of documents, that the user has opened within a predetermined time period (e.g. the last fourteen days), and/or that the user is most likely to open next.

The object model 300 can include the predictor 310. The predictor 310 can include and/or implement an algorithm that addresses and/or solves the problem described by the prediction category 306 by receiving input events and producing a value. Each prediction category 306 can be associated with multiple predictors 310, with each predictor 310 solving problems for a single category, according to an example implementation.

The prediction category 306 can also be associated with an accuracy function 308. The accuracy function 308 can describe how performance of predictors in the prediction category 306 should be evaluated. The accuracy function 308 can evaluate the accuracy of a suggestion by comparing which document was actually opened to the confidence levels of suggestions, and/or scores, for documents that were and were not opened. The accuracy function 308 and/or server 106 can test different predictors 310 through the same accuracy function 308 to determine the accuracy of the predictors 310.

The prediction category 306 can also be associated with an input converter 302. The input converter 302 can convert raw events, such as whether specific documents were or were not opened and the context in which the documents were or were not opened, into events that the predictor 310 is capable of processing. The prediction category 306 can also be associated with an output converter 304. The output converter 304 can convert raw events into target values for predictors 310 to use in training and evaluation.

The predictors 310 can include one or more heuristic predictors 312 and/or one or more machine learning predictors 314. The heuristic predictor 312 can use rules to build a target value based on input events, such as a most recently accessed document, other specified interactions by the user with the document, other specified interactions by other users with the document, or relationships between the document and other documents or events on the user's calendar.

The machine learning predictor 314 can apply machine learning techniques such as training a neural network as described herein to produce target values and/or scores for documents based on input events. The machine learning predictor 314 can receive input from one or more of an input transform function 316, a target value transform function 318, and/or an output transform function 320. The input transform function 316 can transform input events into an input feature vector for the machine learning predictor 314. The target value transform function 318 can transform target values into expected output feature vectors. The output transform function 320 can transform output of the machine learning predictor 314 into a value, such as a likelihood that a document will be accessed.

Figure 4:
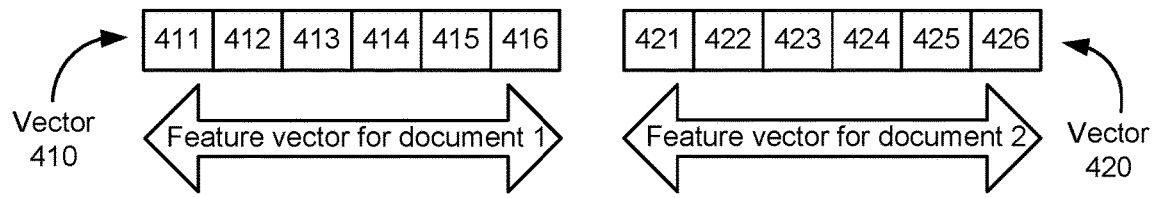
FIG. 4 shows vectors representing documents according to an example implementation.

FIG. 4 shows vectors 410, 420 representing documents according to an example implementation. The vectors 410, 420 can describe features of documents with which the vectors 410, 420 are respectively associated. In an example implementation, the first vector 410 can represent a first document that was accessed by a user in a specific context (the specific context can include input events such as a time of day, day of week, month, and/or year, relationship of and/or interactions by the user with the first and/or second document, relationship of and/or interactions by other users with the first and/or second document, and/or relationship between the first and/or second document and other documents associated with the user and/or items on the user's calendar), and the second vector 420 can represent a second document that was not accessed by the user in the specific context.

Each vector 410, 420 can include multiple numerical values 411, 412, 413, 414, 415, 416, 421, 422, 423, 424, 425, 426, which can be binary or Boolean values. While FIG. 4 shows six numerical values 411, 412, 413, 414, 415, 416, 421, 422, 423, 424, 425, 426 for each vector 410, 420, the vectors 410, 420 can include many more than six numerical values 411, 412, 413, 414, 415, 416, 421, 422, 423, 424, 425, 426. The numerical values 411, 412, 413, 414, 415, 416, 421, 422, 423, 424, 425, 426 can indicate input events and/or a specific context of the document such as whether the document represented by the vector 410, 420 was accessed by the user within a predetermined time period, whether the document was accessed a minimum number of times within a predetermined time period, whether the document was accessed by the user at a similar time of day, a same day of the week, or a same day of the month, whether the document includes outstanding comments, whether the user uploaded, commented on, edited, or accessed the document, whether other users shared or suggested the document to the user, commented on the document, edited the document, or opened the document, whether the document is related to other documents associated with the user, and/or whether the document is associated with an upcoming event on the user's calendar, as non-limiting examples. The vectors 410, 420 can be applied as inputs into the neural network of the server 106. In an example implementation, the output of the neural network should be greater than 0.5 if the neural network predicts that the first document is more likely than the second document to be the next document accessed by the user, and less than 0.5 if the neural network predicts that the second document is more likely than the first document to be the next document accessed by the user.

In an example implementation, the numerical values 411, 412, 413, 414, 415, 416, 421, 422, 423, 424, 425, 426 can be divided into buckets representing events (and/or input events or elements of a specific context of the document), and each bucket, which can represent a particular type of event (such as the user opening the document, another user sharing the document with the user, the user sharing the document with another user, another user notifying the user about the document, the user updating the document, the user commenting in the document, another user commenting in the document, the document being related to another document, the user editing the document, the user creating the document, the user uploading the document, the user editing the document, or another user uploading the document), can be further divided into buckets representing time periods (which may or may not be equal time periods). The values can then represent events that occurred with respect to the document and when the event occurred. The buckets can represent periods of time, such as a minute, an hour, a day, a week, or a month. The numerical values 411, 412, 413, 414, 415, 416, 421, 422, 423, 424, 425, 426 can be ones or zeroes to represent whether or not the event occurred within the time periods, or can be counts of events within the time period or logarithmic or exponential representations of counts of events within the time period. The events can be individual activities (e.g. editing the document) or combinations of activities (opening or editing the document). The events can be associated with the user for whom the predictions are being performed, or can be associated with other users. The events can correspond to the document for which the prediction is being made, or to other documents associated with and/or stored on behalf of the user. Frequencies of activities with respect to documents can be represented as comparisons to other documents, such as whether the document is in the first quantile for frequency, second quantile for frequency, third quantile for frequency, fourth quantile for frequency, or fifth quantile for frequency. Time can be represented in time-date format, units of time preceding the current time, or can be converted to an angle on a circle, such as Monday being zero radians, and Tuesday 2/7 radians. The numerical values 411, 412, 413, 414, 415, 416, 421, 422, 423, 424, 425, 426 can be the sine or cosine of the angle. The vectors 410, 420 can also include data about the user's activity independent of the document for which the prediction is made, such as the number of documents the user has created and/or synchronized within a time period, a number of folders the user has created within a time period, a number of collaborators with the user on the document or other documents, and/or an amount of data uploaded by the user within a time period, as non-limiting examples.

Figure 5:
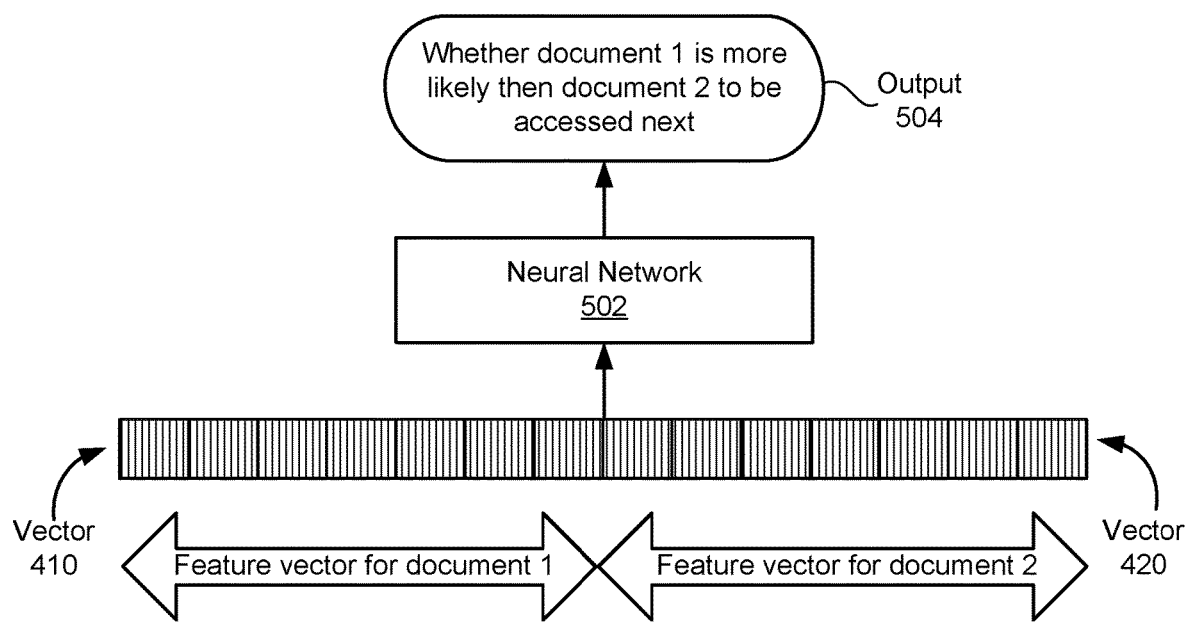
FIG. 5 is an object model of a system for determining likelihoods of documents to be accessed according to an example implementation.

FIG. 5 is an object model of a system for determining likelihoods of documents to be accessed according to an example implementation. The system, which can be included in the server 106, can include a neural network 502 that receives as input the vectors 410, 420 described above with respect to FIG. 4. The neural network 502 can be trained to estimate a probability that the first document (represented by vector 410) will be the next document accessed and/or edited by the user, given that one of either the first document or the second document (represented by vector 420) is the next document opened and/or accessed by the user. The output 504, which can return a value between zero (0) and (1), can be converted into a Boolean value indicating which of the first document and the second document is more likely to be the next document opened and/or edited by the user. The vectors can be inputted into the neural network 502 in pairs, with scores for the vectors increasing when the vector was selected and decreasing when the vector was not selected. The increase in score from the first vector being associated with the opened document can be greater when the second vector associated with an unopened document had a higher score than the first vector and lesser when the second vector had a lower score than the first vector, and the decrease in score from the first vector being associated with the document that was not opened can be lesser when the second vector had a higher score than the first vector, and greater when the second vector had a lower score than the first vector. Inputting the vectors into the neural network 520 and modifying scores associated with the documents and vectors 410, 420 can iteratively generate scores that have little changes from additional inputs of the vectors into the neural network 502. The neural network can be modified and/or tuned to maximize the accuracy of the scoring.

After inputting vectors representing each document associated with the user against multiple other vectors representing other documents and returning scores between zero and one for each vector, the documents can be ranked according to the scores for their associated vectors. The documents can be ranked according to a sorting algorithm, such as insertion sort. The server 106 can include the N (where N is a predetermined number at least one, such as one, two, three, five, or ten) documents with highest scores in the set of documents that the server 106 sends to the client 102.

In an example implementation, the neural network 502 can result in complementarity failures, in which the first document achieves a higher score than the second document, but when the vectors are reversed, the second document achieves a higher score than the first document. To address these complementarity failures, the neural network 502 can apply each comparison (of a same first vector representing a same first document against a same second vector representing a same second document) twice, reversing the order of the first and second vectors the second time, to reduce complementarity failures.

Figure 6:
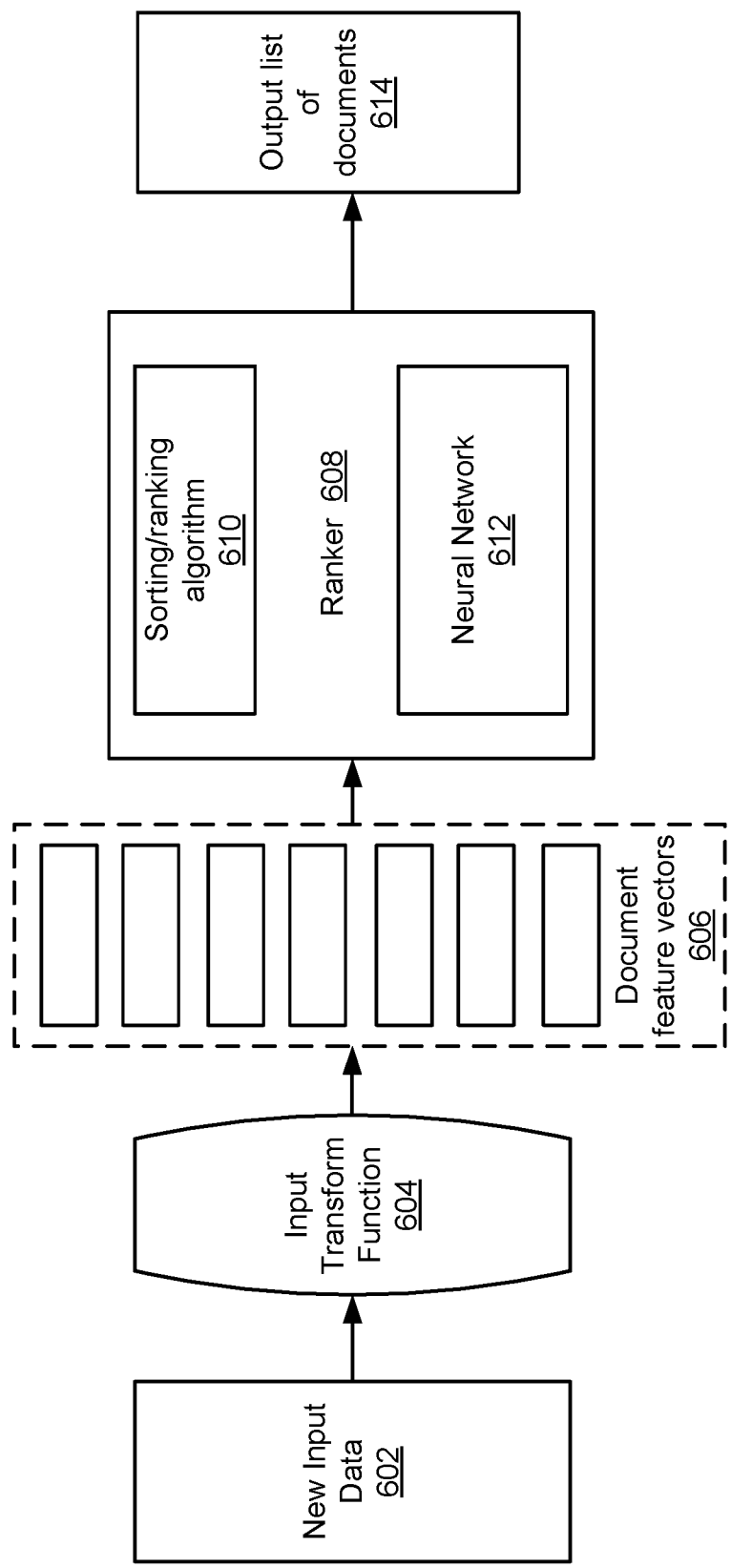
FIG. 6 shows a data path of a document predictor according to an example implementation.

FIG. 6 shows a data path of a document predictor according to an example implementation. The document predictor, which can include the components shown in FIG. 6 and can be an example of a predictor 310 shown and described with respect to FIG. 3, can be included in the server 106. In this example, raw input data 602, such as the specific documents, the specific contexts of each of the specific documents, and whether the user accessed and/or opened the specific documents, can be provided as input to an input transform function 604. The input transform function 604 can generate one document feature vector 410, 420 for each document, representing the features and/or attributes of each document by numerical values. The document feature vectors 606 can be inputted into a ranker 608. The ranker 608 can rank the documents according to likelihood of being opened by the user, as described above. The ranker 608 can include a neural network 612, such as the neural network 502 described above, that receives pairs of vectors 410, 420 as inputs and outputs scores for the vectors, and a sorting or ranking algorithm 610, such as insertion sort, to sort or rank the vectors and associated documents. The ranker 608 can output a set 614 of the documents in ranked and/or sorted order.

Figure 7:
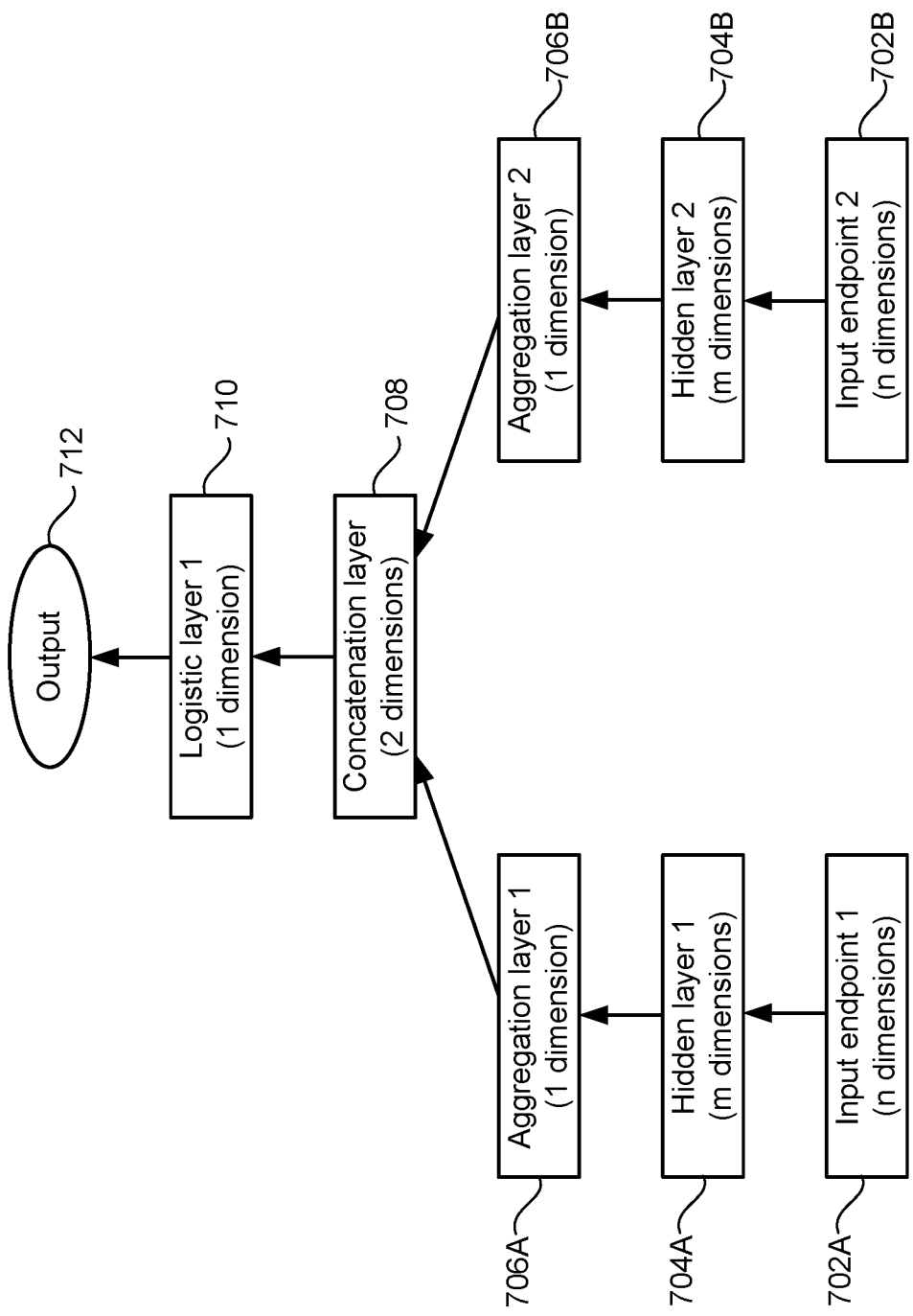
FIG. 7 shows a structure of a neural network for predicting a next document that a user will access according to an example implementation.

FIG. 7 shows a structure of a neural network for predicting a next document that a user will access according to an example implementation. The features described with respect to FIG. 7 can be included in the neural network 502 and/or server 106.

In training the neural network 502, the first vector 410 can be provided as input to the input endpoint 1 702A, which can include multiple (n) dimensions, and the second vector 420 can be provided as input into the input endpoint 2 702B, which can also include multiple (n) dimensions. The input endpoint 1 can receive a floating point vector representing interactions with a document by one or more users, including the user of the client 102. The input endpoint 1 702A can provide input into a hidden layer 1 704A, which can include multiple (m) dimensions, and the input endpoint 2 702B can provide input into a hidden layer 2 704B, which can include multiple (m) dimensions. The hidden layer 1 704A can provide input into an aggregation layer 1 706A, which can include one dimension, and the hidden layer 2 704B can provide input into an aggregation layer 2 706B, which can include one dimension.

The hidden layers 704A, 704B can be rectified linear unit (ReLU) layers, and the aggregation layers 706A, 706B can be linear layers. Parameters for the input into hidden layer 1 704A can be shared with parameters for the input into hidden layer 2 704B, and parameters for input into the aggregation layer 1 706A can be shared with parameters for input into the aggregation layer 2 706B. The sharing of parameters between the two towers (the first tower including 702A, 704A, 706A, and the second tower including 702B, 704B, 706B) can simulate running a same single tower (which would include only 702A, 704A, 706B) simultaneously and/or concurrently with two different inputs (the two vectors 410, 420). The input endpoints 702A, 702B, hidden layers 704A, 704B, and aggregation layers 706A, 706B can determine scores for documents based on the vectors received by the input endpoints 702A, 702B.

A concatenation layer 708, which can include two dimensions, can receive input from the aggregation layers 706A, 706B. The input that the concatenation layer 708 receives can be a pair of scores for the pair of documents received by the input endpoints 702A, 702B. The scores can be values between zero and one, representing likelihoods of each document in the pair of documents being selected. The scores can be complements of each other, adding up to one. The concatenation layer 708 can provide input into a logistics layer 710, which can include one dimension. The logistics layer 710 can provide an output 712, which can be a score indicating likelihoods of the documents represented by the vectors 410, 420 being accessed and/or opened by the user, or can be an indication of which of the two documents in the pair has the higher score. In an example, the logistics layer 710 may not undergo training, and can have fixed incoming weights of negative one (−1) and positive one (+1), and a fixed bias of zero (0). The hidden layers 704A, 704B and aggregation layers 706A, 706B can be trained during a training stage.

In training the neural network, multiple pairs of documents can be provided as inputs into the input endpoint 1 702A and the input endpoint 2 702B. The following tasks can be performed iteratively to train the neural network. First, a pair of documents including first vector 410, representing a first document W ("winner") that was opened and/or accessed by the user, and a second vector 420, representing a second document L ("loser") that was not opened and/or accessed by the user, are selected. Second, the vectors 410, 420 are provided as input into the network shown in FIG. 7 to obtain outputs $S_W$, representing a first score indicating the likelihood that the first document W (representing the "winner" document that was selected) will be selected, and $S_L$, representing a second score indicating the likelihood that the second document L (representing the "loser" document that was not selected) will be selected. Third, an error value δ is calculated based on a function that includes both the first score $S_W$ and the second score $S_L$. In an example implementation, the function can be $δ=1/(1+\exp(S_W-S_L))$. Fourth, the neural network can be updated based on the error δ, such as by backpropagating the error δ. The error +δ can be backpropagated through the part of the network that includes the input endpoint 1 702A, hidden layer 1 704A, and aggregation layer 1 706A, and the error −δ can be backpropagated through the part of the network that includes the input endpoint 2 702B, hidden layer 2 704B, and aggregation layer 2 706B. The four tasks can be performed iteratively on multiple pairs of documents to optimize the neural network.

The components of FIG. 7 are used for training the neural network. In an example implementation, when making predictions, only the input endpoint 1 702A, hidden layer 1 704A, and aggregation layer 1 706A can operate to generate predictions and/or scores for a vector representing a single document.

Figure 8:
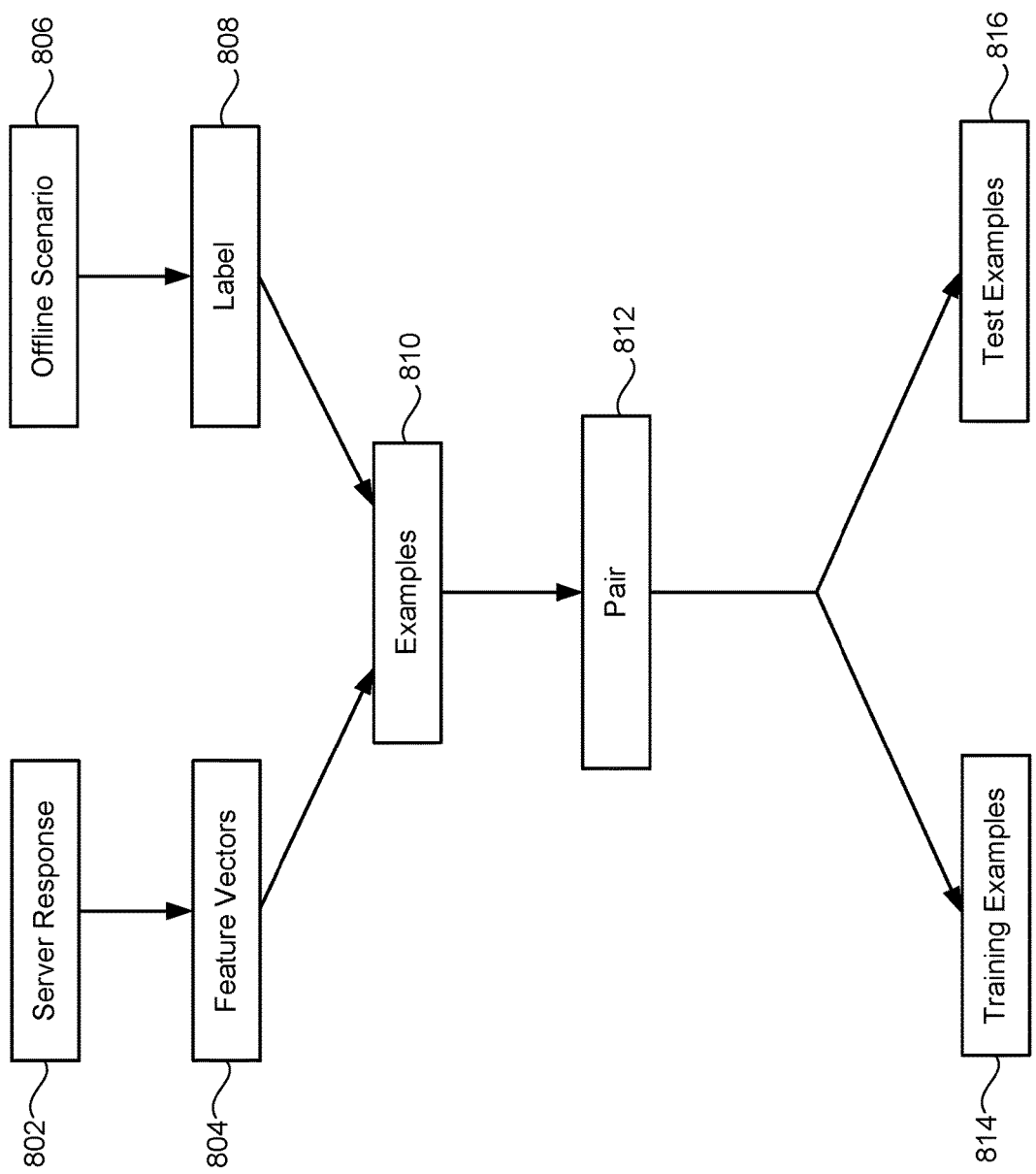
FIG. 8 is a flow diagram showing a work flow for predicting a next document according to an example implementation.

FIG. 8 is a flow diagram showing a work flow for predicting a next document according to an example implementation. This work flow can be performed by the server 106. In this example, the server 106 can respond (802) to a request for a set of documents likely to be opened by the user by generating feature vectors 410, 420 (804). In an offline scenario (806), which can be based on a state of events at a previous time, documents can be labeled (808) based on whether the documents were opened, such as being labeled one (1) if the document associated with the feature vector was opened, and zero (0) if the document associated with the feature vector was not opened. The server 106 can request the state of events and/or specific context of the documents from the offline scenario 806, receive the labeled documents from the offline scenario 806, and generate the feature vectors 410, 420 (804) based on the labeled documents.

The server 106 can apply the labels to the feature vectors 410, 420 to generate examples. The server 106 can pair the examples (810), generating pairs of feature vectors (812). The server 106 can divide the generated pairs into a first subset used for training examples (814), and a second subset used for test examples (816) used to generate predictions, rankings, and sets to send to the client 102.

Figure 9:
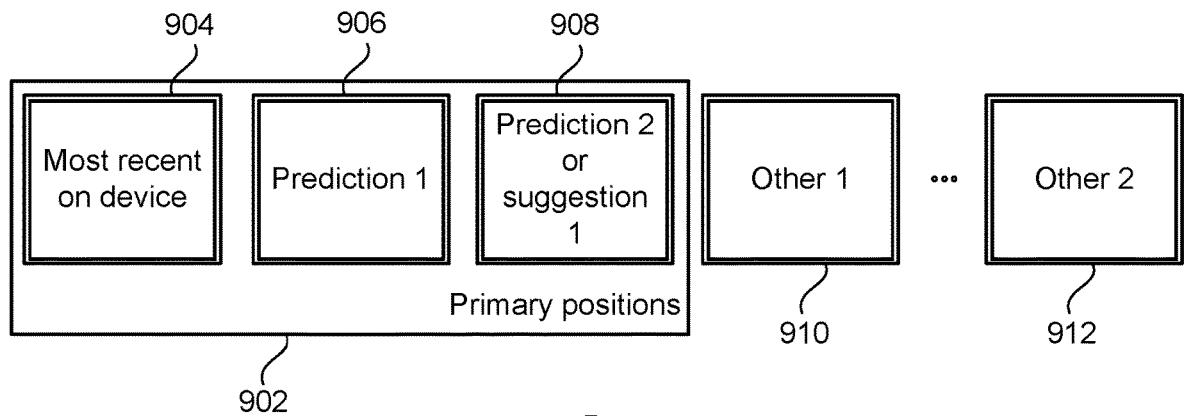
FIG. 9 shows icons representing documents predicted to be opened by a user according to an example implementation.

FIG. 9 shows icons 904, 906, 908, 910, 912 representing documents predicted to be opened by a user according to an example implementation. In this example, the server 106 predicted that the documents represented by the icons 904, 906, 908, 910, 912 are most likely to be opened by the user of the client 102, and included the documents, or references to the documents, in the set of documents in the suggestion message. Primary positions 902 can include less than all of the icons 904, 906, 908, 910, 912, but can include a number of the icons 904, 906, 908 that can be displayed by the client 102 and be visible and understandable to the user. In this example, the suggestion message includes or references ten documents, and the primary positions 902 include icons 904, 906, 908 representing three of the documents included in the suggestion message. The user can scroll on the display of the client 102 to cause the client 102 to display icons 904, 906, 908, 910, 912 other than the icons 904, 906, 908 in the primary positions 902.

The documents represented by the icons 904, 906, 908, 910, 912 can be based on scores or predicted likelihoods of being opened by the user, or suggested potential motives for the user to open the documents. In the example shown in FIG. 9, a first document represented by the icon 904 was determined by the client 502 as a document most recently accessed on the client 102, a second document represented by the icon 906 is a document that the server determined to have the highest score indicating that the document was most likely to be opened by the user, and a third document represented by the icon 906 is either a document that the server 106 determined to have the second highest score indicating that the document was next most likely to be opened by the user or was suggested for a motive such as the document was accessed within a predetermined time, was suggested to the user by another user, or is related to an upcoming event on the user's calendar. The client 102 can present the icon 904 representing a document determined by the client 102, such as because the document is the most recently accessed document on the client 102, to ensure that at least one document is displayed while the other documents are fetched from the server 106.

Figure 10:
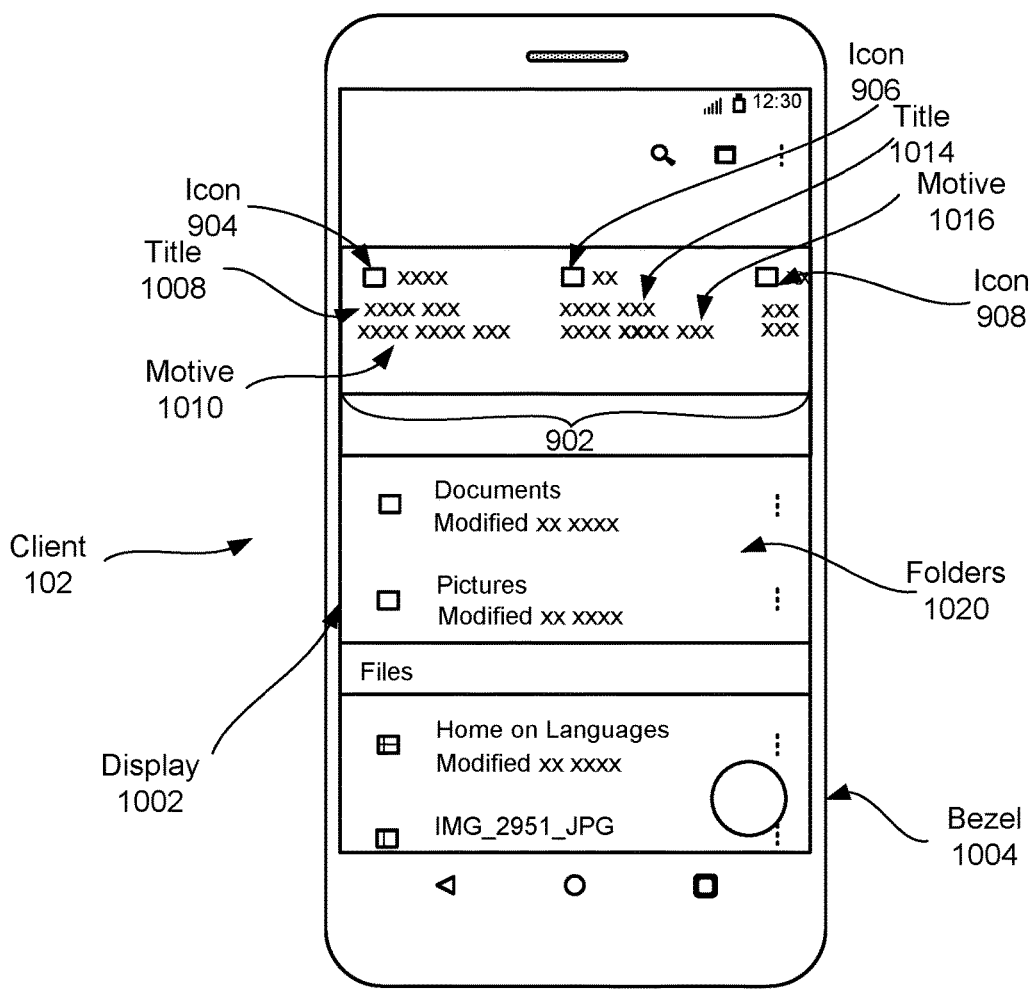
FIG. 10 shows a client presenting icons representing documents predicted to be opened by a user according to an example implementation.

FIG. 10 shows a client 102 presenting icons 904, 906, 908 representing documents predicted to be opened by a user according to an example implementation. In this example, the client 102, which can include a user device or mobile device such as a smartphone, can include a display 1002 surrounded by a bezel 1004. When the user has launched a document access application, the display 1002 can present the icons 904, 906, 908 in the primary positions 902, titles 1008, 1014 of documents represented by icons 904, 906, and motives 1010, 1016 for suggesting the documents. The display 1002 can also present icons representing folders 1020 for the user to navigate a path file to find documents.

Figure 11:
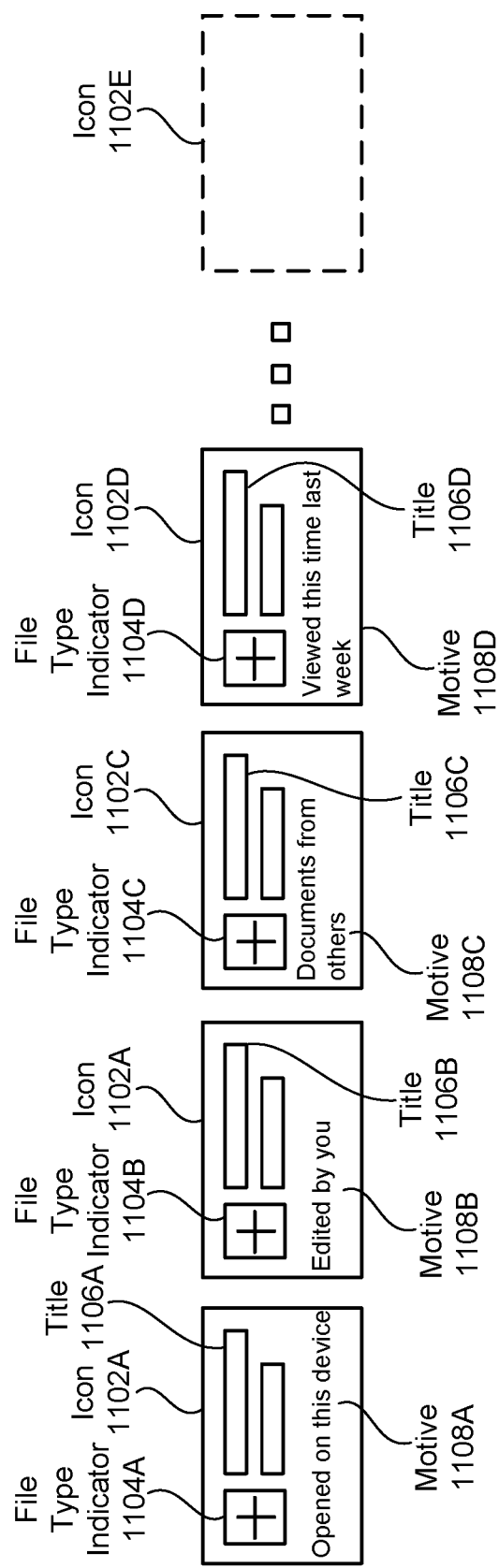
FIG. 11 shows icons representing documents predicted by the server to be opened by a user according to an example implementation.

FIG. 11 shows icons 1102A, 1102B, 1102C, 1102D, 1102E representing documents predicted by the server 106 to be opened by a user according to an example implementation. The icons 1102A, 1102B, 1102C, 1102D, 1102E, which can be presented by the display 1002 of the client 102, can include file type indicators 1104A, 1104B, 1104C, 1104D, 1104E indicating types of files for the documents (such as word processing documents, image documents, or portable document files), titles 1106A, 1106B, 1106C, 1106D, 1106E of the documents, and motives 1108A, 1108B, 1108C, 1108D, 1108E for suggesting the documents. The motives 1108A, 1108B, 1108C, 1108D, 1108E can include, for example, the user having accessed the document within a predetermined time period, such as within the previous twenty-four hours or day, previous week, or month, the user having accessed the document frequently, such as at least a threshold number of times within a predetermined time period, the user having edited, commented on, or uploaded, the document within a predetermined time period, another user having shared or suggested the document to the user, the document being related to an upcoming meeting on the user's calendar, another user having commented on, edited, or uploaded the document, or the document being related to other documents associated with the user account, as non-limiting examples.

In an example implementation, the server 106 can store the motives in an ordered set, and select the first motive for which the selected document satisfies the criterion or criteria for the motive. The motives can be ordered based on "uniqueness," or unlikeliness of being satisfied. The motives that are least likely to be satisfied can be higher in the order, and/or the server 106 can determine whether the less likely motives are satisfied first before determining whether more likely motives are satisfied. The likeliness can be determined based on a past history by the user of motives being satisfied, or an aggregate history of multiple users. For example, the server 106 can determine whether a document was commented on within the last hour (and if so, present "commented on within the last hour" as a motive) before determining whether the document was commented on within the last week. In an example implementation, the server 106 can select different motives for different documents, such as by not selecting a specific motive for a second document if that same motive was selected for the first document and determining whether subsequent motives are satisfied for the second document.

Figure 12:
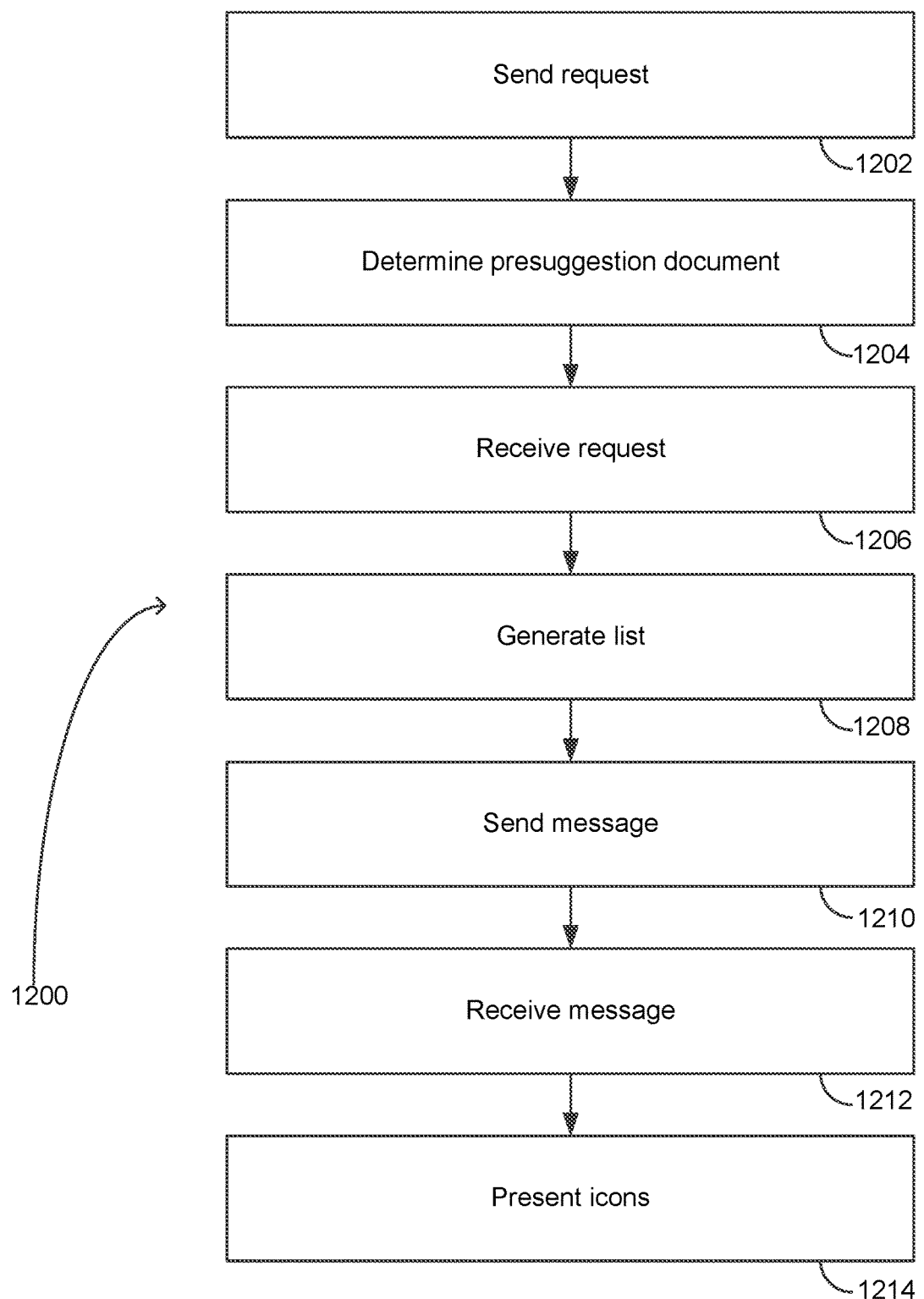
FIG. 12 is a flowchart showing a method according to an example implementation.

FIG. 12 is a flowchart showing a method 1200 according to an example implementation. According to this example, the method 1200 can include the client 102, which can be a smartphone client, sending, to the server 106, a request for a list of documents likely to be opened by the user (1202). The method 1200 can further include the client 102 determining a single and/or client-suggested document to present to the user (1204). The method 1200 can also include the server 106 receiving, from the client 102, the request for the list of documents likely to be opened by the user (1206). The method 1200 can also include the server 106 generating the list of documents likely to be opened by the user based on interactions with the documents by the user (1208). The method 1200 can also include the server 106 sending, to the client 102, a document suggestion message, the document suggestion message including the list of documents likely to be opened by the user (1210). The method 1200 can also include the client 102 receiving the document suggestion message from the server 106 (1212), and presenting, on a display 1002, icons 904, 906, 908 representing the single document and multiple documents included in the list of documents received from the server (1214).

According to an example, the generating the list (1208) can include generating the list of documents likely to be opened by the user based on attributes of the user, attributes of each document in the list, and attributes of other documents stored in association with the user.

According to an example, the client 102 can send the request for the list of documents likely to be opened by a user (1202) in response to the user launching a document access application on the smartphone client.

According to an example, the client 102 can determine the single and/or presuggestion document to present to the user based on a most recently accessed document.

According to an example, the client 102 can determine the single and/or presuggestion document to present to the user based on a document that has been most recently accessed and synchronized with the server.

According to an example, the client 102 can determine the single and/or presuggestion document to present to the user based on a most frequently accessed document over a predetermined time period.

According to an example, the client 102 can present, on the display 1002 with the icons 904, 906, 908 representing the single and/or presuggestion document and the multiple documents, a reason 1010, 1016 for the user to open each of the single and/or presuggestion document and the multiple documents.

According to an example, the client 102 can present icons 904, 906, 908 representing the single and/or presuggestion document and less than all of the documents included in the list of documents, and present icons 910, 912 representing remaining documents included in the list of documents in response to the user swiping on the display 1002.

According to an example, the client 102 can present icons representing folders 1020, the folders representing paths to files.

According to an example, the client 102 can determine that a data rate of communication with the server does not meet a minimum threshold, and based on determining that the data rate of communication with the server does not meet the minimum threshold, determine multiple documents to present to the user, and present, on the display, icons representing the multiple documents.

According to an example, the client 102 can determine that a number of documents synchronized with the server meets a predetermined minimum, and send, to the server, the request for the list of documents likely to be opened by the user based on the determination that the number of documents synchronized with the server meets the predetermined minimum.

Figure 13:
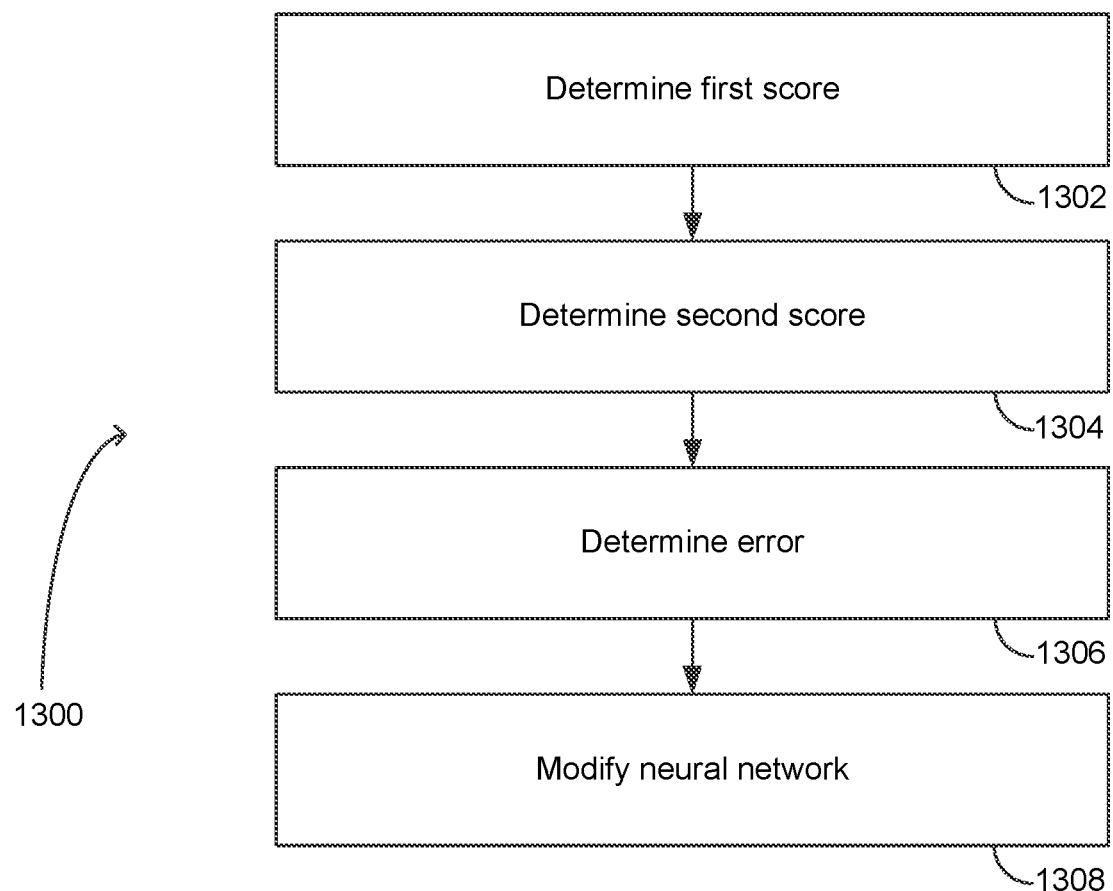
FIG. 13 is a flowchart showing a method of training a neural network to determine scores for documents, the scores indicating likelihoods of a user selecting the respective documents, according to an example implementation.

FIG. 13 is a flowchart showing a method 1300 of training a neural network to determine scores for documents, the scores indicating likelihoods of a user selecting the respective documents, according to an example implementation. According to this example, the method 1300 can include the server 106 determining, by the neural network 502, a first score for a first vector 410 representing a first document that was selected by the user in a specific context, the first vector including indications of interactions by the user with the first document (1302). The method 1300 can also include the server 106 determining, by the neural network 502, a second score for a second vector 420 representing a second document that was not selected by the user in the specific context, the second vector including indications of interactions by the user with the second document (1304). The method 1300 can also include the server 106 determining an error value based on a function that includes both the first score and the second score (1306). The method 1300 can also include the server 106 modifying the neural network 502 based on the error value (1308).

According to an example, the first vector 410 can include a label of one (1) indicating that the first document was selected, and the second vector 420 can include a label of zero (0) indicating that the second document was not selected.

According to an example, the first vector 410 can include indications of whether the first document was accessed by the user within a user access time period, whether the first document was accessed by the user at least a frequency threshold number of times within a frequency time period, whether the first document was accessed by the user within a time of day range of a time of day associated with the specific context, whether another user shared the first document with the user within an other user shared period of time, whether another user suggested the first document to the user within a notification period of time, whether the first document was updated within an update period of time, whether the first document has outstanding comments, whether the first document was commented on within a comment period of time, whether the first document is related to another document, whether the first document was accessed by the user during a previous week on a day of the week associated with the specific context, whether the first document was accessed by the user within a user access time period, whether the user commented on the first document within a user comment period of time, whether the user created the first document within a creation period of time, whether the user uploaded the first document within an upload period of time, whether another user updated the first document within an update period of time, whether another user commented on the first document within an another user comment period of time, and whether another user uploaded the first document within an another user upload period of time.

According to an example, the second score can be an inverse of the first score.

According to an example, the first score can be a value between zero (0) and one (1), inclusive, and the second score can be one (1) minus the first score.

According to an example, the function can be $\delta=1/(1+\exp(S_W-S_L))$, where $\delta$ is the error value, $S_W$ is the first score, and $S_L$ is the second score.

According to an example, the modifying the neural network can include backpropagating the error value through the neural network.

A method of determining a likelihood that a user will select a document can include providing a single vector, representing the document, as an input to the neural network trained according to the method 1300, and generating a document score based on the single vector and the neural network, the document score indicating the likelihood that the user will select the document.

Figure 14:
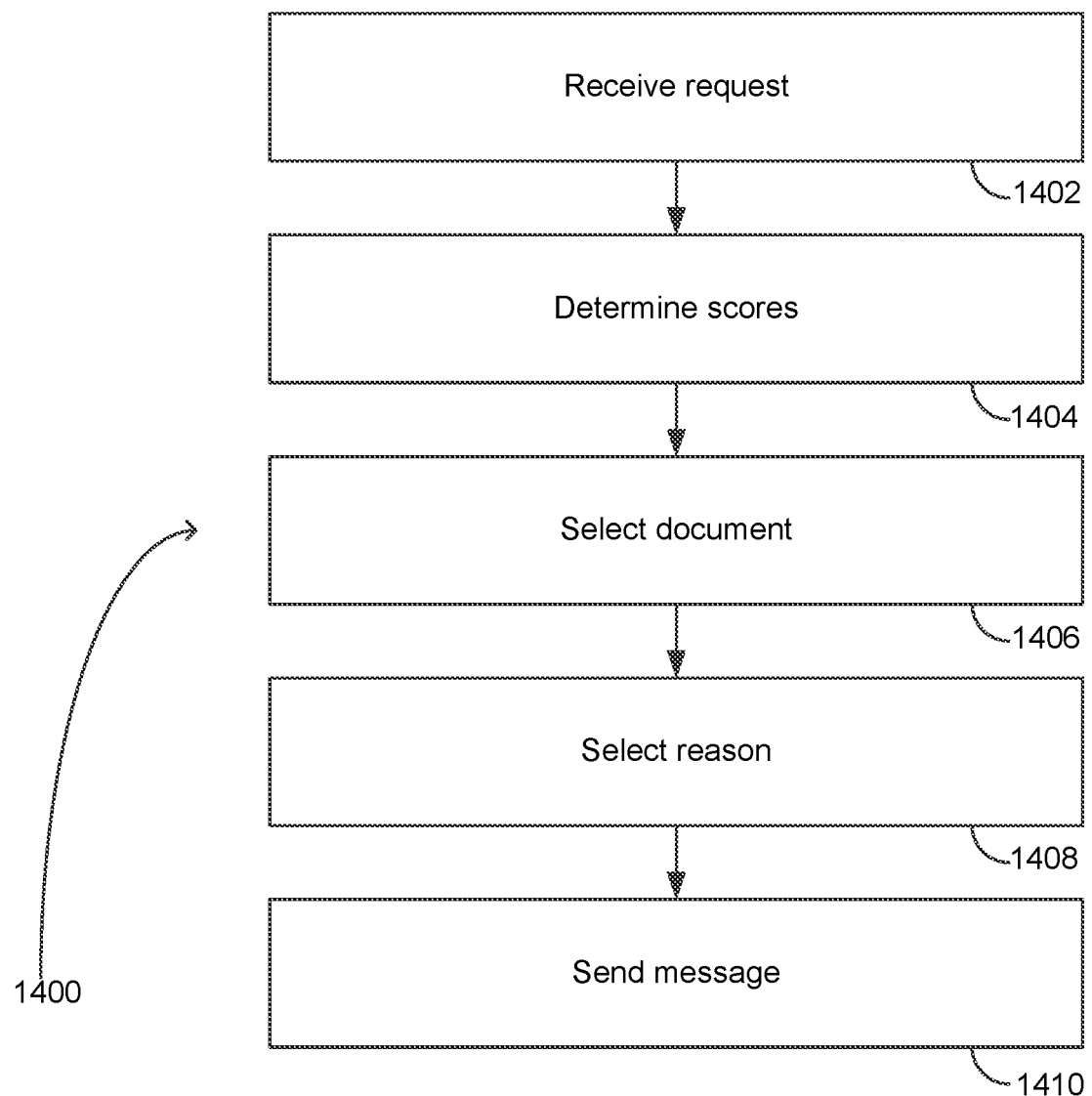
FIG. 14 is a flowchart showing a method according to an example implementation.

FIG. 14 is a flowchart showing a method 1400 according to an example implementation. According to this example, the method 1400 can include the server 106 receiving, from a client 102, a request for a list of documents likely to be accessed in association with a user account (1402). The method 1400 can also include the server 106 determining scores for each of multiple documents stored in association with the user account, the scores indicating likelihoods that the documents will be accessed in association with the user account at a time of receiving the request (1404). The method 1400 can also include the server 106 selecting at least one document from the multiple documents based on the determined scores (1406). The method 1400 can also include the server 106 selecting, from multiple suggested reasons, at least one suggested reason for the user account to access the at least one document (1408). The method 1400 can also include the server 106 sending, to the client 102, a document suggestion message including the at least one document and the at least one suggested reason, the document suggestion message prompting the client to present at least one icon representing the at least one selected document in association with the at least one suggested reason.

According to an example, the selecting the suggested reason can be performed independently of determining the scores.

According to an example, the selecting the suggested reason can include selecting the suggested reason that will maximize a likelihood that the user account will access each of the at least one selected document.

According to an example, the selecting the suggested reason can include consulting a database including records of suggested reasons and indications of whether the user account accessed documents with the suggested reasons, and selecting a suggested reason that will maximize a likelihood that the user account will access the at least one selected document based on the records of suggested reasons and indications of whether the user account accessed documents with the suggested reasons.

According to an example, the method 1400 can further include selecting a second document according to a rule, and the document suggestion message can include the at least one document, the at least one suggested reason, and the second document. The document suggestion message can prompt the client 102 to present at least a first icon representing the at least one selected document in association with the at least one suggested reason and a second icon representing the second document in association with the rule used to select the second document.

According to an example, the selecting the at least one document can include selecting at least a first document and a second document from the multiple documents based on the determined scores, the selecting the suggested reason can include selecting, from multiple suggested reasons, a first suggested reason for the user account to access the first document and a second suggested reason for the user to access the second document, and the sending the document suggestion message can include sending, to the client, the document suggestion message including the first document, the first suggested reason, the second document, and the second suggested reason, the document suggestion message prompting the client to present icons representing the at first document in association with the first suggested reason and the second document in association with the second suggested reason.

According to an example, the method 1400 can further include receiving, from the client, an indication of whether the at least one document was accessed, and updating a database to modify a likelihood of selecting the suggested reason selected for the selected document based on whether the at least one document was accessed.

According to an example, the method 1400 can further include, for at least one future document suggestion message, increasing a likelihood of selecting the suggested reason if the at least one document was accessed and decreasing the likelihood of selecting the suggested reason if the at least one document was not accessed.

According to an example, the method 1400 can further include randomly selecting at least one random document to generate experimental data, selecting, from the multiple suggested reasons, at least one suggested reason for the user account to access the random document, sending, to the client, the at least one random document and the at least one suggested reason for the user account to access the random document along with the at least one document and the at least one suggested reason in the document suggestion message, the document suggestion message prompting the client to present at least one icon representing the at least one selected document in association with the at least one suggested reason and the at least one random document and the at least one suggested reason for the user account to access the random document, receiving, from the client, an indication of which, if any, of the at least one document and the random document was accessed, and updating a database to modify likelihoods of selecting the suggested reason selected for the at least one document and selecting the suggested reason selected for the random document based on which, if any, of the at least one document and the random document was accessed.

According to an example, the at least one suggested reason for the user account to access the random document can be randomly suggested from the multiple suggested reasons.

According to an example, a suggested reason for the user account to access a first document of the at least one selected document can be based on activity associated with the user account, and a suggested reason for the user account to access a second document of the at least one selected document can be based on the user account having accessed the second document within a predetermined period of time before the request.

According to an example, a suggested reason for the user account to access a first document of the at least one selected document can be based on the user account having accessed the first document at least a threshold number of times before the request, and a suggested reason for the user account to access a second document of the at least one selected document can be based on the user account having accessed the second document on a previous day at a time of day within a threshold time from a time at which the request was received.

According to an example, a suggested reason for the user account to access a first document of the at least one selected document can be based on the first document having been shared with the user account by another user account within a threshold time before the request, and a suggested reason for the user account to access a second document of the at least one selected document can be based on the user account having notified of the document within a threshold time before the request.

According to an example, a suggested reason for the user account to access a first document of the at least one selected document can be based on the first document having been updated within a threshold time before the request, and a suggested reason for the user account to access a second document of the at least one selected document can be based on the second document including outstanding comments.

According to an example, a suggested reason for the user account to access a first document of the at least one selected document can be based on the first document including a comment dated within a comment period time before the request, and a suggested reason for the user account to access a second document of the at least one selected document can be based on the second document having a relationship to a document that has been accessed by the user account within an access period of time before the request.

According to an example, a suggested reason for the user account to access a first document of the at least one selected document can be based on the user account having accessed the first document on a same day of a previous week and at a time of day that can be within a daytime period of a time of receiving the request, and a suggested reason for the user account to access a second document of the at least one selected document can be based on the second document having a score indicating a high likelihood that the user account will access the document.

According to an example, a suggested reason for the user account to access a first document of the at least one selected document can be based on the user account having accessed the first document within twenty-four hours from a time of receiving the request, and a suggested reason for the user account to access a second document of the at least one selected document can be based on the user account having accessed the second document within one week from a time of receiving the request.

According to an example, a suggested reason for the user account to access a first document of the at least one selected document can be based on the user account having accessed the first document within one month from a time of receiving the request, and a suggested reason for the user account to access a second document of the at least one selected document can be based on the user account having accessed the second document at least once before the request.

According to an example, a suggested reason for the user account to access a first document of the at least one selected document can be based on the user account having accessed the first document within a daytime period of time of receiving the request for each of a previous two days, and a suggested reason for the user account to access a second document of the at least one selected document can be based on the user account having accessed the second document on a same day of a week as a day receiving the request and within a time of day period of time from a time of receiving the request for a previous two weeks.

According to an example, a suggested reason for the user account to access a first document of the at least one selected document can be based on the user account having accessed the first document each of two previous days from a day that the request was received, and a suggested reason for the user account to access a second document of the at least one selected document can be based on the user account having accessed the second document each of two previous weeks from a week that the request was received.

According to an example, a suggested reason for the user account to access a first document of the at least one selected document can be based on the user account having edited the first document within twenty-four hours of a time at which the request was received, and a suggested reason for the user account to access a second document of the at least one selected document can be based on the user account having edited the second document within one week from a day on which the request was received.

According to an example, a suggested reason for the user account to access a first document of the at least one selected document can be based on the user account having edited the first document within one month from a day on which the request was received, and a suggested reason for the user account to access a second document of the at least one selected document can be based on the user account having edited the second document at least once before the request was received.

According to an example, a suggested reason for the user account to access a first document of the at least one selected document can be based on the user account having commented on the first document within twenty-four hours of a time at which the request was received, and a suggested reason for the user account to access a second document of the at least one selected document can be based on the user account having commented on the second document within one week from a day on which the request was received.

According to an example, a suggested reason for the user account to access a first document of the at least one selected document can be based on the user account having edited the first document within a previous month from a day on which the request was received, and a suggested reason for the user account to access a second document of the at least one selected document can be based on the user account having commented on the second document at least once before the request was received.

According to an example, a suggested reason for the user account to access a first document of the at least one selected document can be based on the user account having created the first document within twenty-four hours of a time at which the request was received, and a suggested reason for the user account to access a second document of the at least one selected document can be based on the user account having created the second document within one week from a day on which the request was received.

According to an example, a suggested reason for the user account to access a first document of the at least one selected document can be based on the user account having created the first document within a month from a day on which the request was received, and a suggested reason for the user account to access a second document of the at least one selected document can be based on the user account having created the second document.

According to an example, a suggested reason for the user account to access a first document of the at least one selected document can be based on the user account having uploaded the first document within twenty-four hours of a time at which the request was received, and a suggested reason for the user account to access a second document of the at least one selected document can be based on the user account having uploaded the second document within one week from a day on which the request was received.

According to an example, a suggested reason for the user account to access a first document of the at least one selected document can be based on the user account having uploaded the first document within a month from a day on which the request was received, and a suggested reason for the user account to access a second document of the at least one selected document can be based on the user account having uploaded the second document before the request was received.

According to an example, a suggested reason for the user account to access a first document of the at least one selected document can be based on the first document having been edited by another user within twenty-four hours of a time at which the request was received, and a suggested reason for the user account to access a second document of the at least one selected document can be based on the second document having been edited by another user within one week from a day on which the request was received.

According to an example, a suggested reason for the user account to access a first document of the at least one selected document can be based on the first document having been edited by another user within one month from a day on which the request was received, and a suggested reason for the user account to access a second document of the at least one selected document can be based on the second document having been edited by another user before the request was received.

According to an example, a suggested reason for the user account to access a first document of the at least one selected document can be based on the first document having been commented on by another user within twenty-four hours of a time at which the request was received, and a suggested reason for the user account to access a second document of the at least one selected document can be based on the second document having been commented on by another user within one week from a day on which the request was received.

According to an example, a suggested reason for the user account to access a first document of the at least one selected document can be based on the first document having been commented on by another user within one month from a day on which the request was received, and a suggested reason for the user account to access a second document of the at least one selected document can be based on the second document having been commented on by another user before the request was received.

According to an example, a suggested reason for the user account to access a first document of the at least one selected document can be based on the first document having been uploaded by another user within twenty-four hours of a time at which the request was received, and a suggested reason for the user account to access a second document of the at least one selected document can be based on the second document having been uploaded by another user within one week from a day on which the request was received.

According to an example, a suggested reason for the user account to access a first document of the at least one selected document can be based on the first document having been uploaded by another user within one month from a day on which the request was received, and a suggested reason for the user account to access a second document of the at least one selected document can be based on the second document having been uploaded by another user before the request was received.

According to an example, a suggested reason for the user account to access a first document of the at least one selected document can be based on the first document having been suggested to the user account by another user within one month from a day on which the request was received, and a suggested reason for the user account to access a second document of the at least one selected document can be based on the second document having been edited by another user before the request was received.

Figure 15:
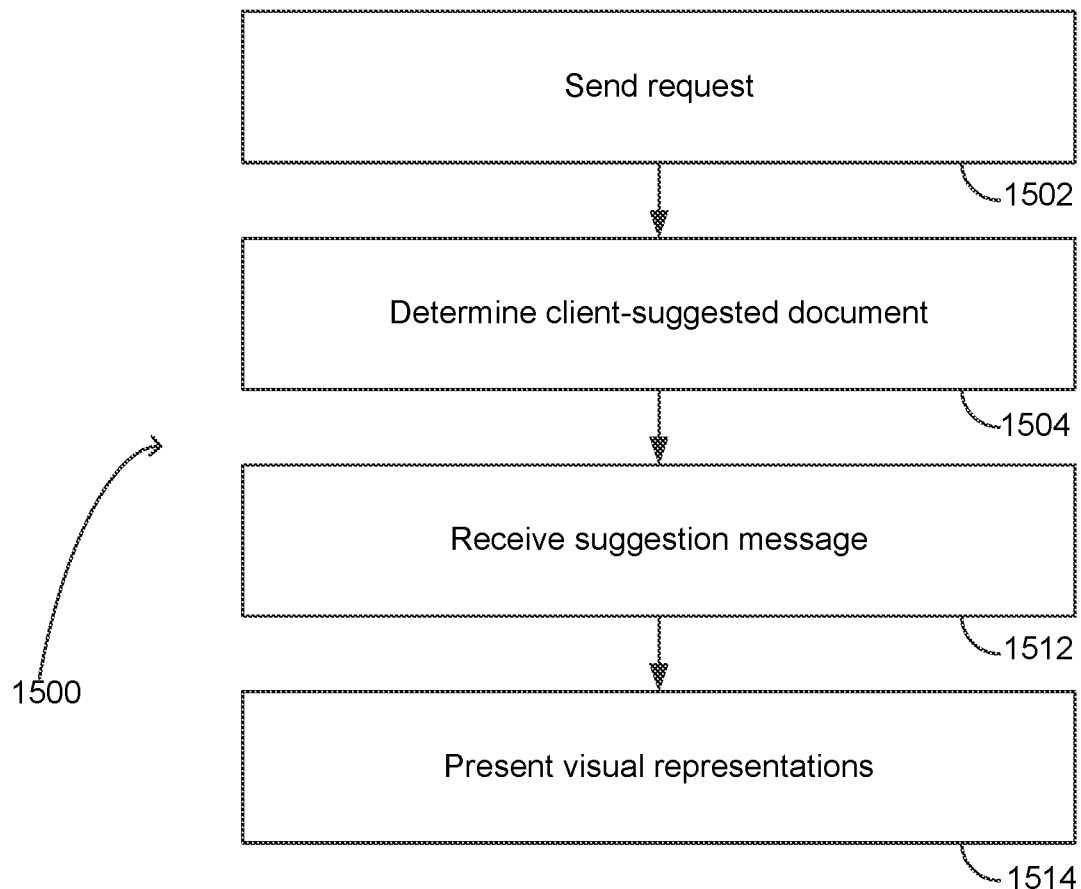
FIG. 15 is a flowchart showing a method according to an example implementation.

FIG. 15 is a flowchart showing a method 1500 according to an example implementation. In this example, the method 1500 includes the user device or client device 102 sending, to a server 106, a request for a set of documents likely to be opened by a user (1502). The method 1500 also includes the user device determining a client-suggested document to present to the user and a potential motive for the user to open the client-suggested document (1504). The method 1500 also includes the user device receiving a suggestion message from the server, the suggestion message including a set of documents likely to be opened by the user and potential motives for the user to open documents in the set of documents (1506). The method 1500 also includes the user device presenting, on a display of the user device, visual representations of the client-suggested document, the potential motive for the user to open the client-suggested document, multiple documents included in the set of documents, and the potential motives for the user to open the multiple documents in the set of documents (1508).

According to an example, the user device sends the request for the set of documents likely to be opened by the user in response to the user launching a document access application on the user device.

According to an example, the user device determines the client-suggested document to present to the user based on a most recently accessed document.

According to an example, the user device the user device determines the client-suggested document to present to the user based on a document that the user device has most recently accessed and synchronized with the server.

According to an example, the user device determines the client-suggested document to present to the user based on a most frequently accessed document over a predetermined time period.

Figure 16:
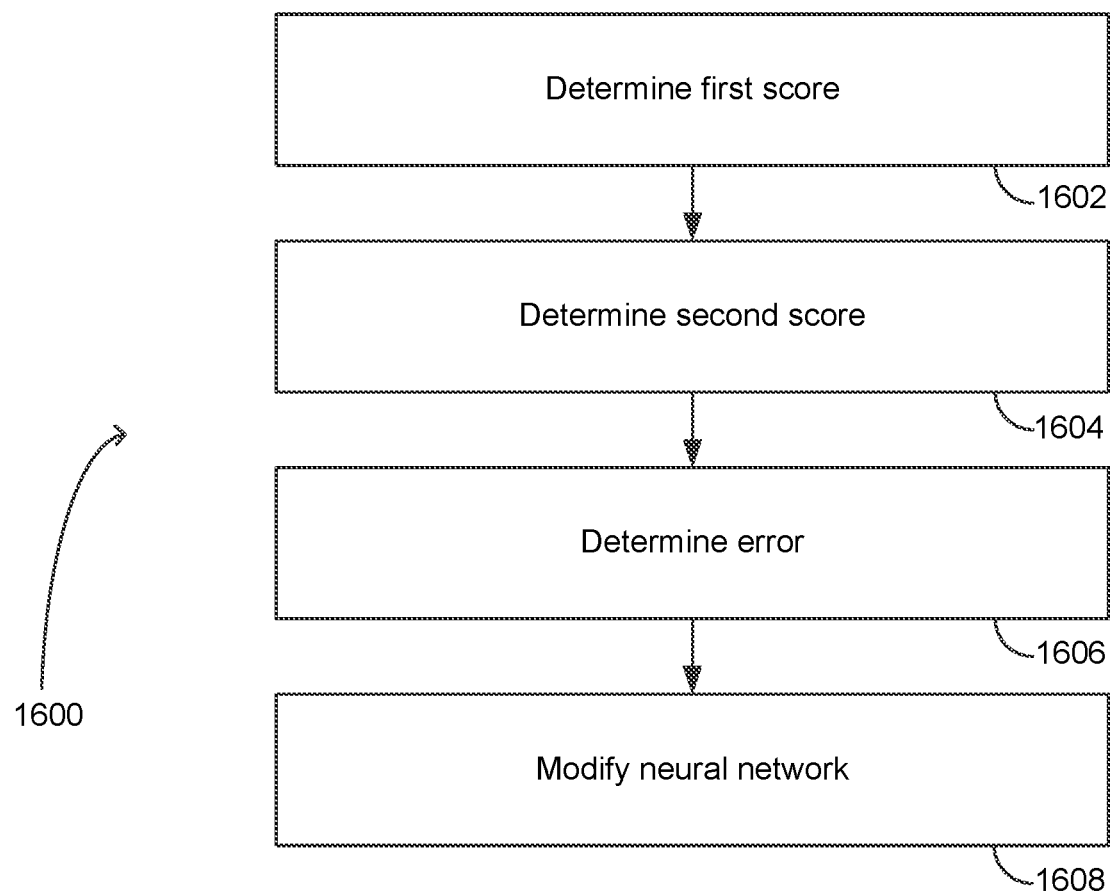
FIG. 16 is a flowchart showing a method according to an example implementation.

FIG. 16 is a flowchart showing a method 1600 of training a neural network to determine scores for documents, the scores indicating likelihoods of a user selecting the respective documents, according to an example implementation. In this example, the method 1600 includes determining, by the neural network, a first score for a first vector representing a first document that was selected by the user in a specific context, the first vector including indications of interactions by the user with the first document (1602). The method 1600 also includes determining, by the neural network, a second score for a second vector representing a second document that was not selected by the user in the specific context, the second vector including indications of interactions by the user with the second document (1604). The method 1600 also includes determining an error value based on a function that includes both the first score and the second score (1606). The method 1600 also includes modifying the neural network based on the error value (1608).

According to an example, the specific context includes a series of documents most recently accessed by the user.

According to an example, the first vector includes a label of one (1) indicating that the first document was selected; and the second vector includes a label of zero (0) indicating that the second document was not selected.

According to an example, the second score is an inverse of the first score.

According to an example, the first score is a value between zero (0) and one (1), inclusive, and the second score is one (1) minus the first score.

According to an example, the function is $\delta=1/(1+\exp(S_W-S_L))$, where $\delta$ is the error value, $S_W$ is the first score, and $S_L$ is the second score.

According to an example, the modifying the neural network includes backpropagating the error value through the neural network.

According to an example, the method 1600 further includes providing a third vector, representing a third document, as an input to the neural network, and generating a third score based on the third vector and the neural network, the third score indicating the likelihood that the user will select the third document.

Figure 17:
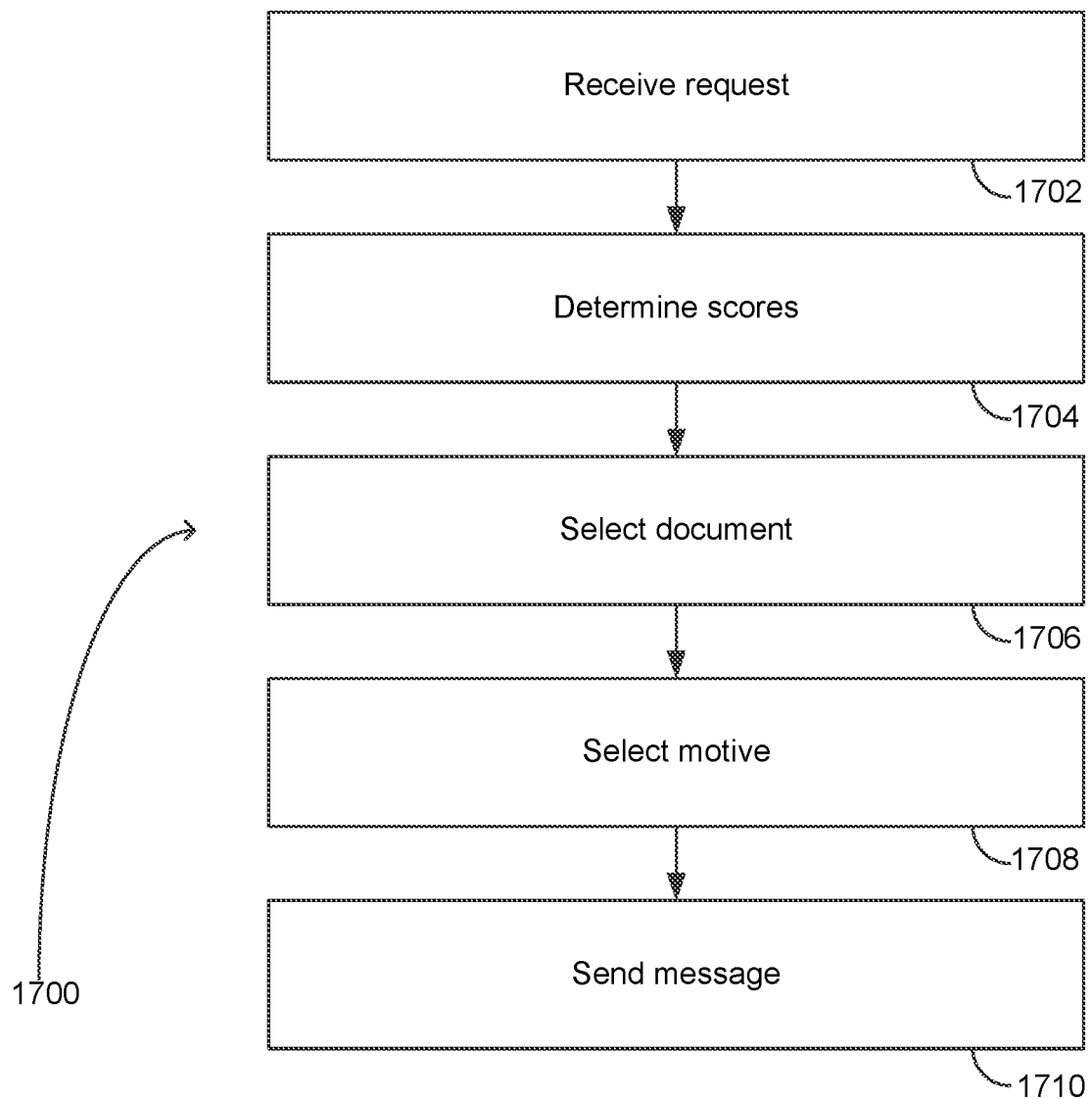
FIG. 17 is a flowchart showing a method according to an example implementation.

FIG. 17 is a flowchart showing a method 1700 performed by the server 106 according to an example implementation. According to this example, the method 1700 includes receiving, from a user device, a request for a set of documents likely to be accessed in association with a user account (1702). The method 1700 also include determining scores for each of multiple documents stored in association with the user account, the scores indicating likelihoods that the documents will be accessed in association with the user account at a time of receiving the request (1704). The method 1700 also includes selecting at least one document from the multiple documents based on the determined scores (1706). The method 1700 also includes selecting, from multiple potential motives, at least one potential motive for the user account to access the at least one document (1708). The method 1700 also includes sending, to the user device, a suggestion message including the at least one document and the at least one potential motive, the suggestion message prompting the user device to present at least one icon representing the at least one selected document in association with the at least one potential motive (1710).

According to an example, the selecting the potential motive (1708) is performed independently of determining the scores (1704).

According to an example, the selecting the potential motive (1708) includes selecting a first potential motive for which one or more predetermined criteria are met.

According to an example, the selecting the potential motive (1708) includes selecting the potential motive that will maximize a likelihood that the user account will access the at least one selected document.

According to an example, the selecting the at least one document (1706) includes selecting at least a first document and a second document from the multiple documents based on the determined scores, the selecting the potential motive (1708) includes selecting, from multiple potential motives, a first potential motive for the user account to access the first document and a second potential motive for the user to access the second document, and the sending the potential motive includes sending, to the user device, the suggestion message including the first document, the first potential motive, the second document, and the second potential motive, the suggestion message prompting the user device to present icons representing the first document in association with the first potential motive and the second document in association with the second potential motive.

According to an example, the determining scores (1704) includes applying the multiple documents to a neural network.

According to an example, the determining scores (1704) includes generating multiple vectors representing the multiple documents and applying the vectors to a neural network.

Figure 18:
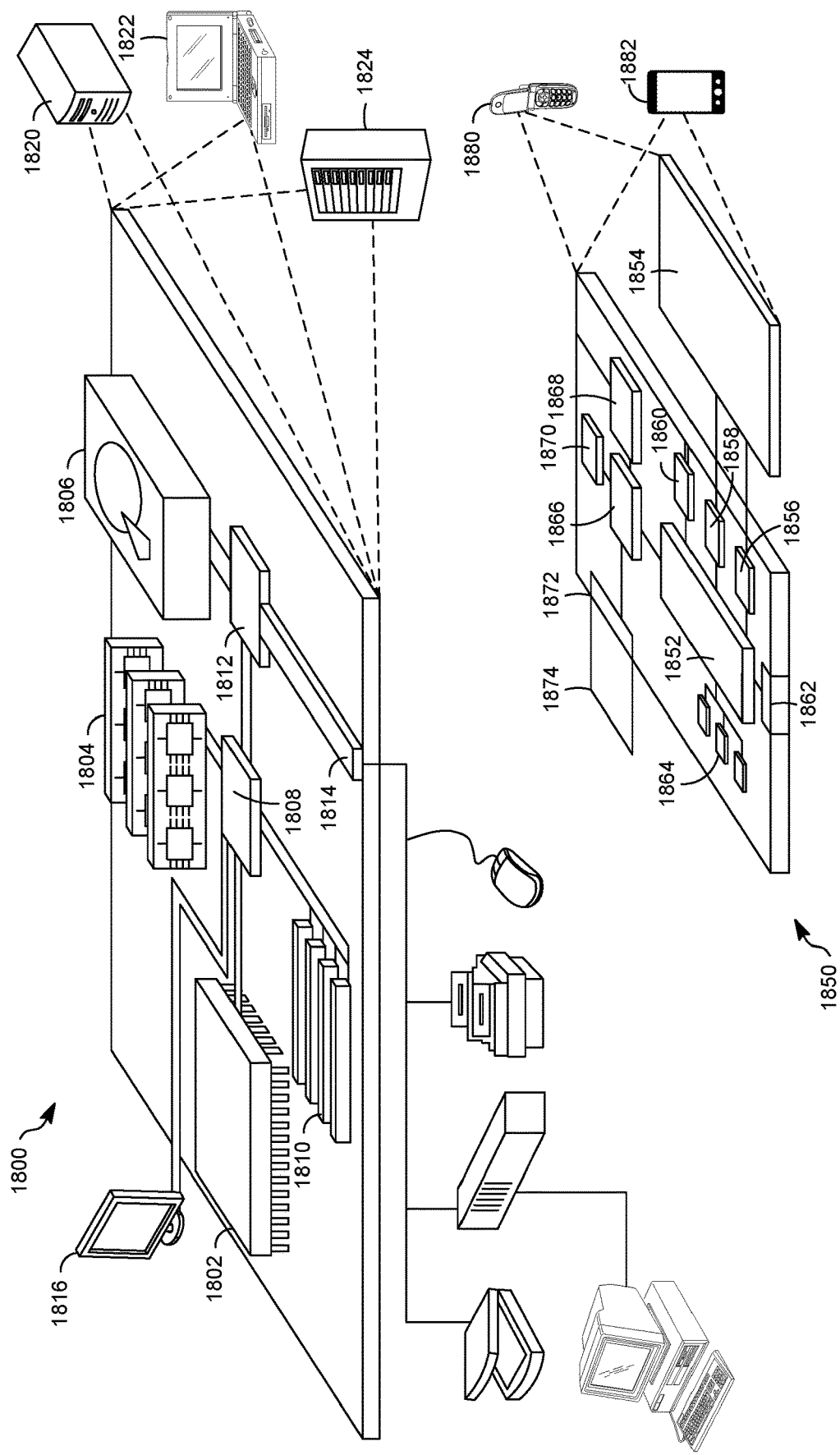
FIG. 18 shows an example of a generic computer device and a generic mobile computer device, which may be used with the techniques described here.

FIG. 18 shows an example of a generic computer device 1800 and a generic mobile computer device 1850, which can be used with the techniques described here. Computing device 1800 is intended to represent various forms of digital computers, such as laptops, desktops, tablets, workstations, personal digital assistants, televisions, servers, blade servers, mainframes, and other appropriate computing devices. Computing device 1850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1800 includes a processor 1802, memory 1804, a storage device 1806, a high-speed interface 1808 connecting to memory 1804 and high-speed expansion ports 1810, and a low speed interface 1812 connecting to low speed bus 1814 and storage device 1806. The processor 1802 can be a semiconductor-based processor. The memory 1804 can be a semiconductor-based memory. Each of the components 1802, 1804, 1806, 1808, 1810, and 1812, are interconnected using various busses, and can be mounted on a common motherboard or in other manners as appropriate. The processor 1802 can process instructions for execution within the computing device 1800, including instructions stored in the memory 1804 or on the storage device 1806 to display graphical information for a GUI on an external input/output device, such as display 1816 coupled to high speed interface 1808. In other implementations, multiple processors and/or multiple buses can be used, as appropriate, along with multiple memories and types of memory. Also, multiple computing devices 1800 can be connected, with each device providing portions of the necessary operations (e.g., as a server bank, a group of blade servers, or a multi-processor system).

The memory 1804 stores information within the computing device 1800. In one implementation, the memory 1804 is a volatile memory unit or units. In another implementation, the memory 1804 is a non-volatile memory unit or units. The memory 1804 can also be another form of computer-readable medium, such as a magnetic or optical disk.

The storage device 1806 is capable of providing mass storage for the computing device 1800. In one implementation, the storage device 1806 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 1804, the storage device 1806, or memory on processor 1802.

The high speed controller 1808 manages bandwidth-intensive operations for the computing device 1800, while the low speed controller 1812 manages lower bandwidth-intensive operations. Such allocation of functions is exemplary only. In one implementation, the high-speed controller 1808 is coupled to memory 1804, display 1816 (e.g., through a graphics processor or accelerator), and to high-speed expansion ports 1810, which can accept various expansion cards (not shown). In the implementation, low-speed controller 1812 is coupled to storage device 1806 and low-speed expansion port 1814. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1800 can be implemented in a number of different forms, as shown in the figure. For example, it can be implemented as a standard server 1820, or multiple times in a group of such servers. It can also be implemented as part of a rack server system 1824. In addition, it can be implemented in a personal computer such as a laptop computer 1822. Alternatively, components from computing device 1800 can be combined with other components in a mobile device (not shown), such as device 1850. Each of such devices can contain one or more of computing device 1800, 1850, and an entire system can be made up of multiple computing devices 1800, 1850 communicating with each other.

Computing device 1850 includes a processor 1852, memory 1864, an input/output device such as a display 1854, a communication interface 1866, and a transceiver 1868, among other components. The device 1850 can also be provided with a storage device, such as a microdrive or other device, to provide additional storage. Each of the components 1850, 1852, 1864, 1854, 1866, and 1868, are interconnected using various buses, and several of the components can be mounted on a common motherboard or in other manners as appropriate.

The processor 1852 can execute instructions within the computing device 1850, including instructions stored in the memory 1864. The processor can be implemented as a chipset of chips that include separate and multiple analog and digital processors. The processor can provide, for example, for coordination of the other components of the device 1850, such as control of user interfaces, applications run by device 1850, and wireless communication by device 1850.

Processor 1852 can communicate with a user through control interface 1858 and display interface 1856 coupled to a display 1854. The display 1854 can be, for example, a TFT LCD (Thin-Film-Transistor Liquid Crystal Display) or an OLED (Organic Light Emitting Diode) display, or other appropriate display technology. The display interface 1856 can comprise appropriate circuitry for driving the display 1854 to present graphical and other information to a user. The control interface 1858 can receive commands from a user and convert them for submission to the processor 1852. In addition, an external interface 1862 can be provide in communication with processor 1852, so as to enable near area communication of device 1850 with other devices. External interface 1862 can provide, for example, for wired communication in some implementations, or for wireless communication in other implementations, and multiple interfaces can also be used.

The memory 1864 stores information within the computing device 1850. The memory 1864 can be implemented as one or more of a computer-readable medium or media, a volatile memory unit or units, or a non-volatile memory unit or units. Expansion memory 1874 can also be provided and connected to device 1850 through expansion interface 1872, which can include, for example, a SIMM (Single In Line Memory Module) card interface. Such expansion memory 1874 can provide extra storage space for device 1850, or can also store applications or other information for device 1850. Specifically, expansion memory 1874 can include instructions to carry out or supplement the processes described above, and can include secure information also. Thus, for example, expansion memory 1874 can provide as a security module for device 1850, and can be programmed with instructions that permit secure use of device 1850. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1864, expansion memory 1874, or memory on processor 1852, that can be received, for example, over transceiver 1868 or external interface 1862.

Device 1850 can communicate wirelessly through communication interface 1866, which can include digital signal processing circuitry where necessary. Communication interface 1866 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 1868. In addition, short-range communication can occur, such as using a Bluetooth, WiFi, or other such transceiver (not shown). In addition, GPS (Global Positioning System) receiver module 1870 can provide additional navigation- and location-related wireless data to device 1850, which can be used as appropriate by applications running on device 1850.

Device 1850 can also communicate audibly using audio codec 1860, which can receive spoken information from a user and convert it to usable digital information. Audio codec 1860 can likewise generate audible sound for a user, such as through a speaker, e.g., in a handset of device 1850.

Such sound can include sound from voice telephone calls, can include recorded sound (e.g., voice messages, music files, etc.) and can also include sound generated by applications operating on device 1850.

The computing device 1850 can be implemented in a number of different forms, as shown in the figure. For example, it can be implemented as a cellular telephone 1880. It can also be implemented as part of a smart phone 1882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs, stored on at least one non-transitory computer-readable storage medium, that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method of training a neural network to determine scores for documents, the scores indicating likelihoods of a user selecting the respective documents, the method comprising:
   determining, by the neural network, a first score for a first vector representing a first document that was selected by the user in a specific context, the first vector including at least one indication whether the user edited the first document in the specific context, the determining the first score comprising:
      inputting the first vector into a first input endpoint of the neural network, the first input endpoint comprising n dimensions;
      providing input from the first input endpoint to a first hidden layer, the first hidden layer comprising m dimensions; and
      providing input from the first hidden layer to a first aggregation layer, the first aggregation layer comprising one dimension;
   determining, by the neural network, a second score for a second vector representing a second document that was not selected by the user in the specific context, the second vector including at least one indication whether the user edited the second document in the specific context, the determining the second score comprising:
      inputting the second vector into a second input endpoint of the neural network, the second input endpoint comprising n dimensions;
      providing input from the second input endpoint to a second hidden layer, the second hidden layer comprising m dimensions; and
      providing input from the second hidden layer to a second aggregation layer, the second aggregation layer comprising one dimension;
   determining an error value based on a function that includes both the first score and the second score; and
   modifying the neural network based on the error value.

2. The method of claim 1, wherein the specific context includes a series of documents most recently edited by the user.

3. The method of claim 1, wherein:
   the first vector includes a label of one (1) indicating that the first document was selected; and
   the second vector includes a label of zero (0) indicating that the second document was not selected.

4. The method of claim 1, wherein the second score is an inverse of the first score.

5. The method of claim 1, wherein:
   the first score is a value between zero (0) and one (1), inclusive; and
   the second score is one (1) minus the first score.

6. The method of claim 1, wherein the function is:

$$\delta=1/(1+\exp(S_W-S_L)),$$

where $\delta$ is the error value, $S_W$ is the first score, and $S_L$ is the second score.

7. The method of claim 1, wherein the modifying the neural network includes backpropagating the error value through the neural network.

8. The method of claim 1, further comprising:
providing a third vector, representing a third document, as an input to the neural network; and
generating a third score based on the third vector and the neural network, the third score indicating the likelihood that the user will select the third document.

9. The method of claim 1, wherein:
the determining the first score further comprises providing input from the first aggregation layer to a concatenation layer, the concatenation layer comprising two dimensions; and
the determining the second score further comprises providing input from the second aggregation layer to the concatenation layer.

10. The method of claim 9, further comprising providing input from the concatenation layer to a logistic layer, the logistic layer comprising one dimension.

11. The method of claim 1, wherein the first hidden layer comprises a rectified linear unit layer.

12. The method of claim 1, wherein the first aggregation layer comprises a linear layer.

13. A method of training a neural network to determine scores for documents, the scores indicating likelihoods of a user selecting the respective documents, the method comprising:
determining, by the neural network, a first score for a first vector representing a first document that was selected by the user in a specific context, the first vector including indications of interactions by the user with the first document and a label indicating that the first document was selected in the specific context, the determining the first score comprising:
inputting the first vector into a first input endpoint of the neural network, the first input endpoint comprising n dimensions;
providing input from the first input endpoint to a first hidden layer, the first hidden layer comprising m dimensions; and
providing input from the first hidden layer to a first aggregation layer, the first aggregation layer comprising one dimension;
determining, by the neural network, a second score for a second vector representing a second document that was not selected by the user in the specific context, the second vector including indications of interactions by the user with the second document and a label indicating that the second document was not selected in the specific context, the second score being an inverse of the first score, the determining the second score comprising:
inputting the second vector into a second input endpoint of the neural network, the second input endpoint comprising n dimensions;
providing input from the second input endpoint to a second hidden layer, the second hidden layer comprising m dimensions; and
providing input from the second hidden layer to a second aggregation layer, the second aggregation layer comprising one dimension;
determining an error value based on a function that includes both the first score and the second score; and
modifying the neural network based on the error value.

14. The method of claim 13, wherein the specific context includes a series of documents most recently accessed by the user.

15. The method of claim 13, wherein:
the first vector includes a label of one (1) indicating that the first document was selected; and
the second vector includes a label of zero (0) indicating that the second document was not selected.

16. The method of claim 13, wherein:
the first score is a value between zero (0) and one (1), inclusive; and
the second score is one (1) minus the first score.

17. A method of training a neural network to determine scores for documents, the scores indicating likelihoods of a user selecting the respective documents, the method comprising:
determining, by the neural network, a first score for a first vector representing a first document that was selected by the user in a specific context, the first vector including indications of interactions by the user with the first document, the determining the first score comprising:
inputting the first vector into a first input endpoint of the neural network, the first input endpoint comprising n dimensions;
providing input from the first input endpoint to a first hidden layer, the first hidden layer comprising m dimensions; and
providing input from the first hidden layer to a first aggregation layer, the first aggregation layer comprising one dimension;
determining, by the neural network, a second score for a second vector representing a second document that was not selected by the user in the specific context, the second vector including indications of interactions by the user with the second document, the determining the second score comprising:
inputting the second vector into a second input endpoint of the neural network, the second input endpoint comprising n dimensions;
providing input from the second input endpoint to a second hidden layer, the second hidden layer comprising m dimensions; and
providing input from the second hidden layer to a second aggregation layer, the second aggregation layer comprising one dimension;
determining an error value based on a function that includes both the first score and the second score, and compares the first vector against the second vector twice, reversing an order of the first vector and the second vector for a second comparison; and
modifying the neural network based on the error value.

18. The method of claim 17, wherein the specific context includes a series of documents most recently accessed by the user.

19. The method of claim 17, wherein:
the first vector includes a label of one (1) indicating that the first document was selected; and
the second vector includes a label of zero (0) indicating that the second document was not selected.

20. The method of claim 17, wherein the second score is an inverse of the first score.

* * * * *